United States Patent
Winterowd et al.

(10) Patent No.: US 11,738,486 B2
(45) Date of Patent: Aug. 29, 2023

(54) RAPIDLY HEATING AND COOLING COMPOSITE MATS COMPRISED OF CELLULOSE AND THERMOPLASTIC POLYMER

(71) Applicant: Continuus Materials Intellectual Property, LLC, The Woodlands, TX (US)

(72) Inventors: Jack G. Winterowd, The Woodlands, TX (US); Matthew Spencer, The Woodlands, TX (US); Marko Suput, The Woodlands, TX (US)

(73) Assignee: Continuus Materials Intellectual Property, LLC, The Woodlands, TX (US)

(*) Notice: Subject to any disclaimer, the term of this patent is extended or adjusted under 35 U.S.C. 154(b) by 308 days.

(21) Appl. No.: 17/171,766

(22) Filed: Feb. 9, 2021

(65) Prior Publication Data
US 2022/0250288 A1    Aug. 11, 2022

(51) Int. Cl.
| | |
|---|---|
| *B29C 43/00* | (2006.01) |
| *B32B 27/00* | (2006.01) |
| *B29C 43/58* | (2006.01) |
| *B29C 43/20* | (2006.01) |
| *B29C 43/52* | (2006.01) |
| *B32B 27/10* | (2006.01) |
| *B32B 27/32* | (2006.01) |

(52) U.S. Cl.
CPC ............ *B29C 43/58* (2013.01); *B29C 43/203* (2013.01); *B29C 43/52* (2013.01); *B32B 27/10* (2013.01); *B32B 27/32* (2013.01); *B29C 2043/5808* (2013.01); *B29C 2043/5816* (2013.01); *B32B 2250/03* (2013.01); *B32B 2250/40* (2013.01)

(58) Field of Classification Search
CPC ....... B29C 43/00; B29C 43/20; B29C 43/203; B29C 43/50; B29C 43/52; B29C 43/58; B32B 27/00; B32B 27/10; B32B 27/30; B32B 27/32
See application file for complete search history.

(56) References Cited

U.S. PATENT DOCUMENTS

| | | | |
|---|---|---|---|
| 2,518,806 A | 8/1950 | Muench | |
| 2006/0103052 A1* | 5/2006 | Reetz | B29C 48/07 |
| | | | 264/320 |
| 2015/0152650 A1* | 6/2015 | Cernohous | B29C 43/305 |
| | | | 428/116 |

FOREIGN PATENT DOCUMENTS

| | | |
|---|---|---|
| CN | 108556090 A | 9/2018 |
| GB | 2 040 801 | 9/1980 |

OTHER PUBLICATIONS

Plesset, et al., "The Growth of Vapor Bubbles in Superheated Liquids", Journal of Applied Physics, [Online] vol. 25, No. 4, (1954), pp. 493-500, Retrieved from the Internet: URL:https://aip.scitation.org/doi/pdf/10.1 063/1.1721668 (retrieved on Jun. 27, 2022).

* cited by examiner

*Primary Examiner* — Jacob T Minskey
*Assistant Examiner* — Matthew Hoover
(74) *Attorney, Agent, or Firm* — Foley & Lardner LLP

(57) ABSTRACT

In accordance with some aspects of the present disclosure, a method producing a composite board comprising plastic and cellulose is described. The method includes transmitting a first signal to a pair of opposing hot-platens, receipt of the first signal causing the pair of opposing hot-platens to compress and heat a composite mat; transmitting a second signal to the pair of opposing hot-platens, receipt of the second signal causing the pair of opposing hot-platens to heat and compress the composite mat at substantially a first pressure for a first time period; transmitting a third signal to the pair of opposing hot-platens, receipt of the third signal causing the pair of opposing hot-platens to release the composite mat from the first pressure; and transmitting a fourth signal to a pair of opposing cold-platens, receipt of the fourth signal causing the pair of opposing cold-platens to compress and cool the composite mat.

18 Claims, 8 Drawing Sheets

RAPIDLY HEATING AND COOLING COMPOSITE MATS COMPRISED OF CELLULOSE AND THERMOPLASTIC POLYMER

BACKGROUND

Effective and environmentally sound waste disposal is a common dilemma faced by most industrialized and developing nations. In recent history, waste has primarily been disposed of in landfills, which require substantial tracts of land that might otherwise be used for other meaningful purposes. Regulatory and political bodies, as well as generators of waste, are increasingly interested in reducing waste volumes, diverting waste from landfills and incinerators while promoting more sustainable usage of waste products. Unfortunately, despite efforts of governments and communities to institute and promote waste recycling programs, there remains a tremendous amount of recyclable material that is not recycled.

There is a critical need to utilize this vast resource and at the same time save the land now occupied as landfill space. It is therefore desirable to develop technologies that not only reduce the amount of waste destined for a landfill or incinerator, but also to capture and use such material for beneficial purposes.

SUMMARY

In accordance with some aspects of the present disclosure, a system for producing a composite board comprised of plastic and cellulose is disclosed. The system may include a mat formation assembly stage configured to form a composite mat comprising plastic, cellulose components, and water, the composite mat having a core at a midpoint between a proximate end and a distal end of the composite mat; one or more pairs of opposing hot-platens that are used in a hot-pressing stage; one or more pairs of opposing cold-platens that are used in a cold-pressing stage that occurs after the hot-pressing stage; and a processor coupled to a memory having programmed instructions, wherein upon executing the programmed instructions, the processor: transmits a first signal to the one or more pairs of opposing hot-platens, receipt of the first signal causing the one or more pairs of opposing hot-platens to compress and heat the composite mat; receives, from a pressure sensor coupled to the one or more pairs of opposing hot-platens, indications of pressure the one or more pairs of opposing hot-platens exerts while compressing the composite mat; based on the indications, transmits a second signal to the one or more pairs of opposing hot-platens, receipt of the second signal causing the one or more pairs of opposing hot-platens to heat and compress the composite mat at substantially a first pressure to superheat the water such that a temperature of the water remains above a boiling temperature of the water at a standard atmospheric pressure without the water changing from a liquid state to a gaseous state for a first time period sufficient for the core of the composite mat to reach a first target temperature; transmits a third signal to the one or more pairs of opposing hot-platens, receipt of the third signal causing the one or more pairs of opposing hot-platens to release the composite mat from the first pressure after the first time period, wherein releasing the composite mat causes the superheated water in the mat to change from a liquid state to a gaseous state; and transmits a fourth signal to the one or more pairs of opposing cold-platens, receipt of the fourth signal causing the one or more pairs of opposing cold-platens to compress and cool the composite mat for a second time period sufficient for the core of the composite mat to reach a second target temperature.

In accordance with some aspects of the present disclosure, a method for producing a composite board comprised of plastic and cellulose is disclosed. transmitting, by a processor, a first signal to one or more pairs of opposing hot-platens of a manufacturing apparatus, the one or more pairs of opposing hot-platens heating and compressing a composite mat comprising plastic, cellulose, and water, the composite mat having a core at a midpoint between a first end and a distal end of the composite mat, receipt of the first signal causing the one or more pairs of opposing hot-platens to compress and heat the composite mat; receiving, by the processor from a pressure sensor coupled to the one or more pairs of opposing hot-platens, indications of pressure the one or more pair of opposing hot-platens exerts while compressing the composite mat; based on the indications, transmitting, by the processor, a second signal to the one or more pairs of opposing hot-platens, receipt of the second signal causing the one or more pairs of opposing hot-platens to heat and compress the composite mat at substantially a first pressure to superheat the water such that a temperature of the water remains above a boiling temperature of the water at a standard atmospheric pressure without the water changing from a liquid state to a gaseous state for a first time period sufficient for the core of the composite mat to reach a first target temperature; transmitting, by the processor, a third signal to the one or more pairs of opposing hot-platens, receipt of the third signal causing the one or more pairs of opposing hot-platens to release the composite mat from the first pressure after the first time period, wherein releasing the pressure on the composite mat causes the water in the composite mat to change from a liquid state to a gaseous state; and transmitting, by the processor, a fourth signal to a one or more pairs of opposing cold-platens of the manufacturing apparatus, receipt of the fourth signal causing the one or more pairs of opposing cold-platens to compress and cool the composite mat for a second time period sufficient for the core of the composite mat to reach a second target temperature.

In accordance with some other aspects of the present disclosure, a non-transitory computer-readable storage medium storing executable instructions that, when executed by one or more processors, cause the one or more processors to control a composite board manufacturing apparatus to produce a composite board comprised of plastic and cellulose is disclosed. The instructions may include instructions to transmit a first signal to one or more pairs of opposing hot-platens of the manufacturing apparatus heating and compressing a composite mat comprising plastic, cellulose, and water, the composite mat having a core at a midpoint between a first end and a distal end of the composite mat, receipt of the first signal causing the one or more pairs of opposing hot-platens to heat and compress the composite mat at substantially a first pressure to superheat the water such that a temperature of the water remains above a boiling temperature of the water at a standard atmospheric pressure without changing from a liquid state to a gaseous state for a first time period sufficient for the core of the composite mat to reach a first target temperature, wherein the water changes into a gaseous state upon an expiration of the first time period; and transmit a second signal to a pair of opposing cold-platens of the manufacturing apparatus, receipt of the second signal causing the one or more pairs of opposing cold-platens to compress and cool the composite mat for a second time period sufficient for the core of the composite mat to reach a second target temperature.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
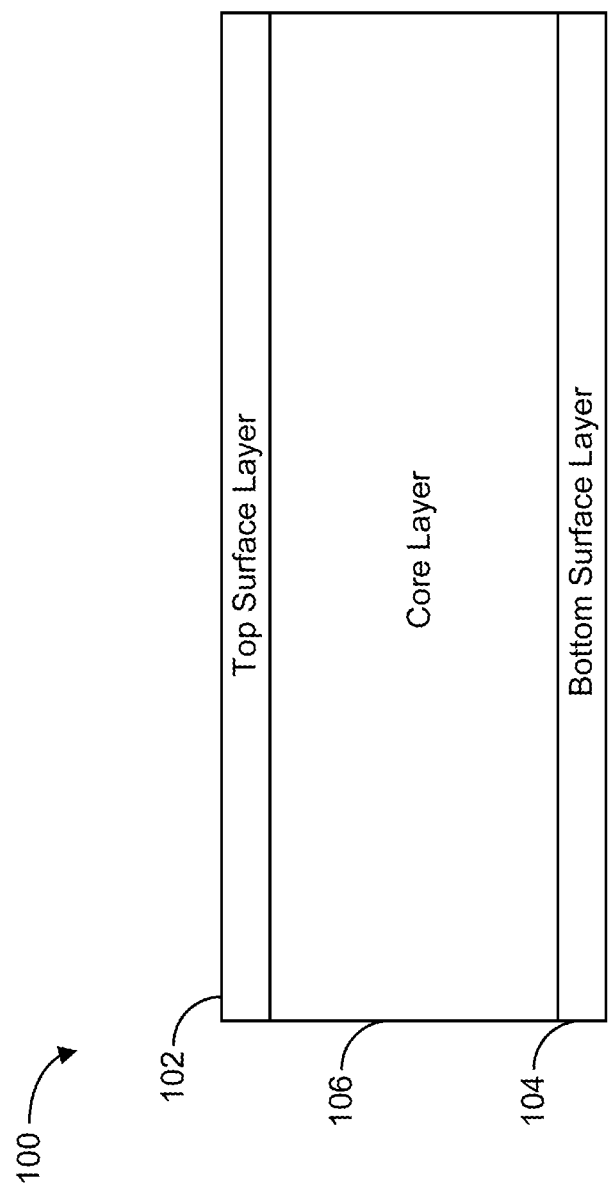
FIG. 1 is an example composite mat, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Current solutions to reducing the amount of waste stored in landfills or incinerators often involve converting the waste into a useful product. For instance, in one example, the waste may be captured, melted, and congealed between two solid materials (e.g., fiberglass or paper) into a composite board comprising a mixture of the captured waste. If the composite board is properly melted and congealed, the composite board may be capable of being exposed to outdoor elements (e.g., sun, rain, snow, sleet, temperature changes, heat, cold, etc.) for prolonged time periods without any substantial deformations. Construction companies may use such composite boards to build roofing and/or side paneling for houses or large buildings. Thus, instead of taking up space in landfills that are increasingly overflowing, waste may be manipulated by manufacturers into a composite board that can benefit many different types of consumers (e.g., homeowners, companies working in offices, warehouse owners, etc.).

Thermoplastic polymers are commonly used in the production of such composite boards. In 2019, about 88.5 billion pounds of thermoplastic resin (polymers) were purchased in the United States. Most of this resin was used in the production of various plastic articles. About 46 billion pounds of this resin was polyethylene in 2019. Processes that are used to convert the polymers into commercial goods may include the steps of:

1. Heating the polymer;
2. Melting the polymer;
3. Forming the polymer into a desired shape and size;
4. Congealing (freezing) the polymer; and
5. Cooling the polymer.

Unfortunately, each of these steps may be relatively slow and energy intensive. Moreover, the large amount of energy required to make products from thermoplastic polymers may place an additional burden on the ecology of our planet.

Processing technologies that utilize thermoplastic polymers to form composite boards can include injection molding, extrusion, thermoforming, film-blowing, and others. These technologies may operate in a nearly anhydrous state.

Injection molding can utilize either thermoplastic or thermosetting polymers. When applied to the former, it involves melting thermoplastic polymers in a first step, and then injecting the molten polymer into a mold (under high pressure) in a second step, and then cooling and solidifying the polymer within the mold in a third step. The polymer might, or might not, be loaded with solid filler particles in the injection-molded process. A heated barrel with either an internal ram or screw may be used to convert thermoplastic pellets into a molten polymer. The barrel temperature of the injection molding equipment is commonly in the range of about 300-700° F., depending on the polymer type that is being processed. Typically, the moisture content of the materials being processed is very low. In many cases, the moisture content needs to be less than 0.1%. Excessive moisture can contribute to polymer degradation, as well as bubbles or streaks in the finished part. Molten material at the end of the barrel passes through a check valve and into a "shot" holding chamber. Typically, a "shot" of molten polymer is discharged rapidly (less than 1 second) at high-pressure into the mold. The mold can exist as a wide array of different shapes and sizes. When applied to thermoplastics, the mold often includes a cooling jacket to facilitate faster cooling and solidification of the part.

Extrusion is a process in which a thermoplastic polymer is converted to a viscous, molten state and then extruded through a die to create a continuous ribbon that has a particular shape and size. In many cases, the extruded part cools spontaneously without the aid of supplemental equipment. The extrusion temperature is set to ensure that the extruded plastic is molten but is highly viscous. Substantial pressure is required to extrude the molten polymer, and although the extruded plastic is initially molten, it is too viscous to undergo significant shape and size distortions immediately after being extruded from the die. As the extruded part cools, the viscosity increases further. Eventually, the thermoplastic polymer congeals, and a stable part is achieved. In some cases, the solidified portion of the extruded part is mechanically pulled, and this version of the technology is commonly referred to as pultrusion. Equipment used to melt the polymer is similar to that used for injection molding. In many cases, the polymer is loaded with fillers and/or other intractable solid particles. Wood-plastic composites (WPCs) are an example of a common commercial material that is made by use of extrusion.

Thermoforming is a process in which a thermoplastic sheet is heated in a first step to a temperature at which it is highly pliable. Heating is commonly achieved by use of an oven. In a second step, the heated plastic sheet is rapidly converted to a desired shape by use of molding, embossing, stretching, cutting, or a combination of these actions. In many cases, vacuum-forming is deployed in the second step.

There is a need for a manufacturing technology for the production of composite boards that improves on existing molding, extrusion, and thermoforming technologies.

Manufacturing technologies for the production of thermoplastic composite boards generally share processing steps that are common to those of injection molding, extrusion, and thermoforming. One sample process is described in U.S. patent application Ser. No. 17/069,567, filed Oct. 13, 2020, the entirety of which is incorporated by reference herein. This process generally involves forming a mat comprised of fragments. In some cases, the fragments are a mixture of discrete paper fragments and/or thermoplastic polymer fragments. In other cases, each fragment is comprised of separate layers of paper and thermoplastic polymer. The mat may include paper/plastic fragments sandwiched between top and bottom layers. These top and bottom layer may include paper, fiberglass, films, and/or other nonwovens or facer fabrics. Typically, thermoplastic adhesive layers are positioned between the paper/plastic fragment-based core and the top and bottom surface layers. The mat may be assembled in a relatively cold state and the component spatial order of the components is mostly preserved throughout the subsequent thermal processing steps. The moisture content of the mat can range from about 0-25%. The mat is first subjected to a hot-pressing step under conditions that compress the mat and melt a significant portion of the thermoplastic polymer, especially polyethylene. In a subsequent step, the hot mat may be subjected to a cold-pressing step under conditions that simultaneously maintain the compressed state of the mat and congeal (e.g., freeze) the molten thermoplastic in the mat.

The process described in U.S. patent application Ser. No. 17/069,567 may be similar to common thermoplastic processing technologies to the extent that it includes the steps of:

1. Heating the polymer;
2. Melting the polymer;
3. Forming the polymer to a desired shape and size;
4. Congealing (freezing) the polymer; and
5. Cooling the polymer.

However, the technology is quite different from the common thermoplastic processing technologies. For example, in some embodiments, panels are made with the new technology using significant amounts of water. In some cases, the moisture content of the mat can be as high as about 25% just prior to thermal processing. The specific spatial arrangement of components in the new panel is established prior to thermal processing and may not be substantially altered by the thermal processing events.

It is also recognized that the new process shares some characteristics that are common to the process used to make wood-based panels. In general, wood-based panels are made by coating wooden elements with thermosetting adhesives, forming the treated wooden elements into a mat, and then consolidating the mat under conditions of heat and pressure. The moisture content of the wooden mat is usually in the range of about 2-6%. The general spatial arrangement of the wooden elements in the mat is preserved in the final wooden panel. In spite of these similarities, the wooden elements have different mechanical properties than the mixture of paper and plastic fragments used in the new technology and the thermosetting binder technology used in the production of wood-based panels is very different than the binder technology used in the new technology.

Common thermosetting binders used in the production of wood-based panels include phenol-formaldehyde resoles, urea-formaldehyde resins, and polymeric methylene diphenyl diisocyanate (pMDI). These thermosetting binders may be converted from a liquid state to a load-bearing solid-state at elevated temperature during the hot-pressing step. Once the thermosetting resin is converted to an intractable solid (that cannot be melted), the wooden elements are bound together and generally remain bound together without the need to rapidly cool the product. Thus, producers of wood-based panels generally attempt to heat the mat as quickly as possible during the hot-pressing step in order to quickly cure the thermosetting binder. At the end of this process, wooden panels may be ejected from the hot-press and may not be subject to a cold-pressing step (a combination of cooling and pressure). That said, some effort may be made to rapidly cool panels made with urea-formaldehyde resin. The purpose of rapidly cooling the urea-formaldehyde based panel is to ensure that the cured urea-formaldehyde does not thermally degrade. Pressure is not applied to the urea-formaldehyde based wooden panels during cooling (because application of pressure is not needed in order to maintain the size and shape of the panel after pressing). Manufacturers of wood-based composites may not be motivated to limit the amount of heating in order to more rapidly cool the panel. Wood-based panels, especially those who utilize phenol-formaldehyde resin or pMDI, may deliberately post-heat the panels through hot-stacking after the hot-pressing step in order to more extensively cure the resin and to thermally modify the wood tissue in a manner that improves its water-resistance.

In contrast to the process used to manufacture wood-based composites, the embodiments described herein may be associated with a motivation to first heat the mat as quickly as possible, but then to immediately cool the mat as quickly as possible while maintaining pressure on the mat in order to achieve a particular caliper (thickness value) in the finished panel. For the sake of achieving maximum processing speed, it can be beneficial to minimize the cumulative time required for both the heating event and the cooling event (under pressure). This particular combination of dynamics is different than that associated with injection molding, extrusion, thermoforming, or the production of wood-based composites.

As previously stated, the moisture content of wooden mats used in the commercial production of wood-based panels that are made with thermosetting adhesives may be limited to a maximum of about 6-8%. When the moisture content of the wooden mat is greater than this, the steam pressure inside of the mat that develops as the mat is being hot-pressed becomes greater than the strength of the mat. Under these conditions, the mat ruptures, sometimes explosively, when the hot-press opens at the end of the pressing cycle. This event is commonly known as a "steam-blow." Panels that experience steam-blows contain localized shape defects that are easily detected in the quality control process. Panels with steam-blows are rejected and are thus financially detrimental.

It is common for wood-based panels, including laminated veneer lumber (LVL), oriented strand board (OSB), medium density fiberboard (MDF), and particleboard (PB) to be made using hot-presses that are "position-controlled". This type of press includes sensors that detect the distance between the top and bottom platen and a control system that continuously adjusts the pressure exerted on the mat to ensure that a particular mat thickness is achieved during the pressing cycle. As an example, a position-controlled press system might specify that a mat will be pressed to a thickness of 0.438 inches for most or all of the pressing event. Hot-presses with this type of control system commonly exert about 600-1,500 psi of pressure on the mat during the initial stages of pressing in order to rapidly compress the mat to a thickness that is equal to or similar to the thickness of the final panel.

Wood is a visco-elastic material. When a wooden object is exposed to a mechanical stress, such as pressure, the object will deform (e.g., bend or compress or twist). Under some environmental conditions and stress levels, the deformation (e.g., strain) in the wooden object will be wholly or partially eliminated when the stress on the wooden object is discontinued. This is the "elastic" behavior of the wood. Likewise, under some environmental conditions and stress levels, the deformation (e.g., strain) in the wooden object will be wholly or partially retained when the stress on the wooden object is discontinued. The degree of this permanent deformation is typically dependent on both the level of the stress and the duration of the stress on the wooden object. This is the "viscous" behavior of the wood. Materials that exhibit both viscous and elastic properties are known as visco-elastic materials.

When wooden mats are being pressed in a position-controlled press, especially at elevated temperature, the mat undergoes some level of permanent deformation during hot pressing. Thus, it exhibits some level of "viscous" behavior. As the mat deforms, the pressure that is required to maintain the targeted thickness of the mat decreases. For instance, the pressure that is exerted by the press on the wooden mat in the beginning of the press cycle in order to achieve a particular targeted mat thickness can be as high as about 600-1,500 psi. In contrast, by the end of the hot-pressing cycle, the pressure exerted on the mat is typically reduced to only about 20-60 psi.

Platen temperatures that are commonly used in the production of wood-based panels range from about 340-430° F. Thus, as mats are subjected to hot-pressing, water in the mat is generally heated to a temperature that exceeds 212° F., which is the boiling point of water at 1 standard atmosphere of pressure. A first portion of the water that exceeds this temperature will be converted to steam (gas) and will leak out of the compressed mat through gaps and pores in the mat structure. A second portion of the water that exceeds a temperature of 212° F. will remain trapped in the mat under pressure. It is this second portion of water in the mat that contributes to the potential for steam-blows. Fortunately, at the end of the wooden panel hot-pressing cycle, the moisture content is typically less than 1-2%, and the thermosetting resins can provide significant internal bond strength between the wooden elements, even when the mat is hot (300-420° F.), in order to prevent a steam-blow. Thus, the wood panels industry has learned that some amount of moisture can be tolerated in the wooden mat (typically less than about 6-8%) prior to pressing without experiencing a steam-blow at the end of the hot-pressing process.

In contrast, the disclosed embodiments can operate with initial mat moisture content levels as high as about 25%. Platen temperatures used in exemplary processes can range from about 310-450° F. Thus, substantial amounts of steam can be generated by hot-pressing paper/plastic fragment mats with a moisture content greater than about 6-8%. In order to avoid destructive steam-blows, venting cycles are introduced into the hot-pressing schedule in the exemplary processes when the moisture content of the mat exceeds about 6-8%. Like wood, the paper/plastic fragments exhibit some level of elastic response to externally applied pressure. Thus, as the press opens momentarily for a venting event, the mat expands to some degree. Since the binder in the disclosed embodiments is a thermoplastic polymer, the bonds between paper elements are immediately reestablished as the press closes after the venting cycle. If such venting events were attempted in the production of a wood-based panel, the mat expansion would easily break the fragile, partially formed bonds associated with the thermosetting resin. Thermosetting resin bonds are typically very weak while they are in a partially cured state.

It follows that a first portion of the water in the paper/plastic fragment mat processed according to the disclosed embodiments is converted to steam (e.g., gas) and leaks out of the sides of the mat while the hot-press is closed or is emitted from the mat while the press is open during venting cycles. A second portion of the water in the paper/plastic fragment mat can exist under pressure in a superheated, liquid state. Most commonly, a core temperature of about 260-300° F. is desired and targeted at the end of the hot-pressing event in order to ensure that a high percentage of the polyethylene in the paper/plastic fragment mat has melted. Achieving a core temperature in the mat of 300° F. is highly desirable and, under typical commercial processing conditions, is almost always coincident with the elimination of essentially all of the water in the mat.

Under typical processing conditions in the disclosed embodiments, when the hot-press opens at the end of the hot-pressing cycle, there is no immediate decrease in the core temperature of the mat. In fact, a thermal gradient typically exists in the mat at the end of the hot-pressing event. Thus, the mat is cooler in the core layer and warmer in the surface layer, which has been in direct contact with the hot-platens. The existence of this thermal gradient results in a condition in which the core layer of the mat actually continues to increase in temperature for some time period after the mat has exited the hot-press and even entered the cold press. This behavior is undesirable because it retards the rate of cooling of the mat in the cold press. Generally, the mat may be cold pressed for a time period sufficient to cool the core layer of the mat to a targeted core temperature (e.g., 195° F.). The core temperature at the end of cold-pressing needs to be sufficiently low to congeal (e.g., freeze) all or most of the molten plastic (commonly polyethylene) in the core layer of paper/plastic fragments. Insufficient cooling under pressure can result in panels having lower strength values. It can also result in caliper values that are greater than that which is targeted or specified. Unfortunately, long cold-pressing periods, which are generally required in order to meet the quality control targets, are economically detrimental.

Thus, there is a need for embodiments that allow for reduced cold-pressing time while simultaneously achieving the core temperature targets at the end of both the hot-pressing event as well as the end of the cold-pressing event.

The disclosed embodiments described herein provide new and improved methods for producing panels from mixtures of paper fragments and plastic fragments, or alternatively, from fragments comprised of both paper and plastic layers. These methods may include the following steps. First, a mat may be formed that includes 1) a heat-resistant bottom facer; 2) a core layer comprised of either a mixture of paper fragments and plastic fragments, or alternatively, fragments comprised of both paper layers and plastic layers; and 3) a heat-resistant top facer. Optionally, the mat further includes adhesive layers (thermoplastic or thermosetting) between the outer facers and the core layer. The core layer may have an initial moisture content of about 3-25% prior to hot-pressing.

Second, the mat may be pressed between hot-platens (surface temperature equal to about 310-450 F). The initial pressure on the mat can range from about 10-1,500 psi. Venting cycles, in which the press opens for brief periods of time (1-3 seconds) can optionally be used in the initial and middle stages of the hot-pressing schedule. Thereafter, a pressure of about 25 psi or greater may be maintained on the mat for the duration of the hot-pressing step such that at the end of the hot-pressing step the moisture content of the mat is in a predetermined range of about 0.5-4.0% (most preferably about 1.5-4.0%) and the core temperature of the mat is in the range of about 260-340° F.

Then, the hot-press is opened such that the pressure on the hot-mat is reduced to about 0-5 psi (most preferably about 0 psi) for a period of about 0.5 seconds or longer. Next, the hot mat is immediately pressed between cold-platens (surface temperature less than about 120 F). The pressure exerted on the mat during cold pressing will generally be in the range of about 5-40 psi and will be sufficient to achieve a panel at a particular targeted caliper (thickness) at the end of the cold-pressing step. The duration of the cold pressing step will generally be dependent on the thickness of the mat as well as other parameters and will be sufficient to congeal all or most of the plastic in the core layer.

Following the described sequence of steps, a sudden and dramatic decrease in core temperature spontaneously occurs in the mat after the hot-pressing step. This rapid temperature drop helps to reduce the time required for the cold-pressing step.

The paper and plastic fragments suitable for the disclosed embodiments can be isolated from municipal solid waste, recycling streams or other waste streams. Alternatively, they can be isolated from un-used materials. Preferred fragments have a thickness ranging from about 0.001-0.100", a width of about 0.1-3.0", and a height of about 0.1-3.0". The shape of the fragments could be rectangular, circular, irregular, or some other shape. Paper and plastic fragments can be obtained by processing larger sections of paper and larger sections of plastic through shredders, mills, or other machines that are designed to disintegrate relatively large objects into relatively small objects. Most machines of this sort have a chamber that contains moving knives, blades or other cutting tools as well as counter knives or other stationary objects that are positioned in close proximity to the path of the moving blades or knives. Materials to be disintegrated are transferred into the compartment at an acceptable feed rate. Typically, a portion of the wall of the compartment includes a screen that has a deliberately selected mesh size. As objects inside of the compartment are reduced in size, they eventually pass through the screen and are then transferred to the next processing center.

Paper fragments can have a moisture content ranging from about 0.1-50%. Plastic fragments will generally have a moisture content of about 0-3%. A dominant component in the plastic will be polymer. Typically, polymer may constitute about 50-100% of the plastic. Polymer types will include, but are not limited to, polyethylene (high density, medium density, and low density), polypropylene (especially isotactic), copolymers of ethylene and propylene, polyesters (including polycarbonate, polyethylene terephthalate and polybutylene terephthalate), polystyrene, polyvinyl chloride and polymers based on acrylonitrile (including AN, ABS and PMMA). Polymers used in plastics can also be based on rubbery monomers such as butadiene or isoprene. Other polymers, such as SBR, can be based on mixtures of rubbery monomers (butadiene) and hard monomers (styrene). Polyethylene is a highly preferred polymer for this disclosure. Many plastics include plasticizers in addition to the polymer resin. Examples of plasticizers include dioctyl phthalate or benzyl butyl phthalate. Plasticizer levels in plastics can range from about 0-40% by weight. Some plastics, including polyvinyl chloride, could have plasticizer levels even greater than 40%. Plastics can also include colorants (dyes and/or pigments), opacifying agents, optical brighteners, preservatives, fillers, and other additives. In some embodiments, plastic may be any plastic that melts within a temperature range of about 70-400 F and may include polyethylene, polypropylene, copolymers of ethylene and propylene, polymers of ethylene and vinyl acetate, polystyrene, acrylic polymers, polymers based of styrene and butadiene, etc.

In some cases, individual fragments are comprised of both paper and plastic. For example, fragments can be made by grinding a beverage carton (e.g., Tetra Pak®) type packaging for liquid beverages. This type of packaging includes continuous paper layers, polyethylene layers, and aluminum foil layers. The level of polyethylene used in these cartons is relatively low (20-30%), but it is distributed continuously and uniformly on the paper. Thus, the distribution of polyethylene on the paper is essentially perfectly optimized. In some cases, this type of fragment might also work well for the purpose of this disclosure, although the plastic level is typically less than 40% by mass.

The basis weight of the paper/plastic fragments in the mat can range from about 0.2-5.0 lb/ft$^2$. Preferred basis weight values are about 1.7-2.5 lb/ft$^2$. Heat-resistant facers include fiberglass fabrics, paper, and films or nonwovens based on polymers, including nylon and polyester, which have melting points in excess of about 420° F.

Adhesive layers can be positioned between the facer and core layers. Suitable adhesive layers include thermoplastic films comprised of polyethylene, polypropylene, ethylene acrylic acid copolymers, and ethylene vinyl acetate copolymers. Acceptable copolymers can also be based on ethylene and propylene. Alternatively, the adhesive layer can be comprised of films based on thermosetting resins that have been solidified, but not fully cured. Such films can be based on phenol-formaldehyde or melamine-formaldehyde resins. Said films can exist as resin only, or in other cases, paper can be coated on both sides with said resins. Further yet, adhesive layers can be prepared by spray-application of aqueous acrylic, styrene-butadiene, or polyvinyl acetate aqueous latex adhesives.

Hot presses suitable for this disclosure include continuous presses, single-opening presses, and multi-opening presses. Control systems can include those that are pressure-controlled or position-controlled. Highly preferred control systems have the ability to establish mat thickness targets in the first portion of the hot-pressing event and then to control for mat pressure targets in the later stages of the hot-pressing event. Press control systems that operate on a position-control basis only are less desirable, because this type of press might not be able to maintain a pressure on the mat of at least 25 psi for the entire duration of the hot-pressing event.

Relatively little systematized information is available regarding the ability of a mat (either wooden or comprised of paper/plastic fragments) to retain steam or superheated water during hot-pressing. The ability to retain steam or water is important to achieve the desired sudden cooling effect at the end of hot-pressing, which is a key benefit. In general, it appears that in order to heat the core layer of the mat to a temperature of about 260-340° F. and simultaneously trap the proper amount of water in the mat, the mat needs to contain absorbent particles (paper fragments) and it needs to be relatively non-porous. In an exemplary embodiment, higher levels of molten plastic and higher pressing pressures at the end of the hot-pressing event help to reduce the porosity of the mat during the latter stages of hot pressing.

At the end of the hot-pressing event, the pressure on the mat is reduced to about 0-5 psi. Most preferably, the hot-press is opened at the end of the hot-pressing event, which eliminates the applied pressure on the mat for a period of at least 0.5 seconds. Under this condition, the superheated liquid water in the mat may be instantaneously converted to steam. In fact, an emission of steam from the mat can be clearly observed at the end of the hot-pressing event when panels are made in accordance with this disclosure. This phase change requires about 2,258 Joules of energy per gram of water. This energy may substantially spontaneously dissipate from the portion of the mat that includes paper, plastic, and non-superheated water. The superheated water within the mat may be partially or wholly ejected from the mat and the loss of energy from the paper, plastic, and non-superheated water portion of the mat may result in a temperature decrease for the portion of the mat that remains in the press. In some cases, an initial temperature decrease at the center of the mat can be as high as about 40-60° F. For example, at a temperature of 300° F., a mat comprised predominantly of a mixture of paper and polyethylene has a specific heat capacity of about 1 J/g/F. Thus, removing 1 J/g of energy may result in a temperature decrease of about 1° F. If 2% of the mat, by mass, is superheated water at the end of the hot-pressing cycle, and all of this superheated water is immediately converted to steam, which may be emitted from the panel, then the expected temperature decrease would be about 45.2° F.

$$\Delta T = \frac{(0.02)\left(2258 \frac{J}{g}\right)}{1.0 \frac{J}{gF}}$$

Thus, the degree of the instantaneous temperature decrease may be proportional to the amount of superheated water that can be retained in the mat at the end of the pressing cycle.

In general, the maximum amount of superheated water that can be retained in the mat without causing a steam-blow is expected to be related to the amount of plastic in the mat, the temperature of the mat at the end of the hot-pressing cycle, the speed at which the pressure on the mat is relieved, and possibly other factors. In an exemplary embodiment, the maximum amount of superheated water that can be retained in the mat at the end of the hot-pressing event without resulting in a steam-blow is about 3%. In other embodiments, the maximum amount of superheated water that can be retained is 5%.

Superheated water has a temperature greater than 212° F. but exists in a liquid state. It is known that external pressure is required to create superheated water. For instance, a gauge pressure of about 53 psi is required in order to achieve a water boiling point of 300° F. Further, a gauge pressure of about 105 psi is required in order to achieve a water boiling point of 340° F. Unfortunately, information regarding the relationship between temperature, gauge pressure, and water vapor pressure in a mat comprised of paper fragments, water, and plastic fragments is not known. A high percentage of water in a mat can be preserved, even up to temperatures as high as about 340° F., by application of about 25-50 psi hot-pressing pressure, especially when the core temperature of the mat has a temperature in the range of about 212-340° F. This result is somewhat unexpected. It could not be predicted from the established relationships between water boiling point and pressure, and it is different than the behavior of water in wooden mats during hot-pressing using conventional position-controlled press systems.

In a preferred embodiment, the initial moisture content of the mat (prior to hot-pressing) is about 4-6%. The mat may have a core temperature at a midpoint between a distal and a proximal end of the mat. As the core temperature of the mat exceeds about 212° F. during the hot-pressing event (using platens with a surface temperature in the range of about 350-450° F.), the pressure exerted on the mat through the platens is maintained in the range of about 25-50 psi until the target core temperature is reached. Ideally, the target core temperature will be in the range of about 260-340° F. When the target core temperature is attained, the pressure on the mat may be mostly or completely relieved for a period of about 0.5 seconds or longer. Preferred levels of pressure on the mat during this relief-period range from about 0-5 psi. Ideally, the panel should be removed from the hot-press immediately during or after the pressure-relief event.

When mats have an initial moisture content of about 5% or higher and are being processed according to the described embodiments with a hot-platen temperature in the range of about 380-450° F., the core temperature of the mat will increase at a rate of about 0.65-1.5° F. per second between a core temperature of about 212-260° F. when the pressure applied to the mat at this point in the hot-pressing event is in the range of about 25-50 psi. When lower pressures are used in this portion of the hot-pressing schedule, liquid water in the mat is converted to steam, which steadily leaks from the edges of the mat at a rate that essentially depletes the mat from water by the time that the target core temperature is reached. This adverse condition can be detected by inspecting the rate of temperature increase in the core of the mat over the temperature range of about 212-260° F. Specifically, the rate of temperature increase will be about 0.2-0.7° F. per second when insufficient mat pressure is being applied. The slow rate of temperature increase is largely due to substantial amounts of thermal energy from the hot-press being diverted to evaporation of the water.

The use of higher levels of polyethylene tends to promote improved bonding between the paper fragments and might also contribute to better retention of superheated water in the mat during the later stages of pressing. Unfortunately, elevated levels of polyethylene in the mat also contribute to the viscous nature of the mat (as opposed to "elastic"). In a position-controlled hot-press, which is commonly used in the wood-based panels industry, the level of pressure exerted on the panel in the later stages of the hot-pressing cycle become extremely low, even approaching zero psi, for mats that are highly viscous. As just discussed, the low pressure at the end of the hot-pressing cycle results in dehydration of the mat. This dilemma can be resolved through the unconventional use of a pressure-controlled hot-press. The viscous nature of the mat in the later stages of hot-pressing results in the potential for excessive compression of the mat. Thus, the disclosed embodiments require the use of relatively low pressures during the initial stages of hot pressing and relatively high pressures (but not too high) during the later stages of hot-pressing, as compared to the pressure schedule that would be experienced using a conventional position-controlled press system. There are no literature references, textbooks, patents, or other prior art that teach this adaptive course of process development.

When panels are being manufactured using the disclosed embodiments on a continuous press that includes a heating zone and a cooling zone, a gap may be designed into the press between the heating and cooling zones in order to create a mechanism to briefly reduce the external pressure that is exerted on the press immediately after hot-pressing.

Suitable cold presses include continuous presses, single-opening presses, and multi-opening presses. Control systems can include those that are both pressure-controlled or position-controlled. Preferred control systems for the cold press are position-controlled. Caliper values specified in a position-controlled system may be equal to the targeted thickness of the resulting panel. Alternatively, the caliper value specified can be about 0.001-0.015 inches less than the targeted thickness of the resulting panel in anticipation of some modest level of "spring-back" when the panel exits the cold press. Pressure-controlled systems can also be used in the cold press. When pressure-controlled systems are used, operators may empirically determine pressure values that will achieve the targeted panel thickness. In general, pressures exerted on the mat during cold pressing are expected to be in the range of about 5-40 psi.

In most cases, cold presses will include coiled tubes that circulate cooling fluid through the top and bottom platens. The cooling fluid can be water, glycol/water mixtures, or oils. Typically, the cooling fluid is pumped through the platens and circulated back to a chiller or refrigeration unit, such as those made by Mokon of Buffalo, N.Y. In general, the chiller should be adjusted to achieve a platen surface temperature of about 20-90° F. Most preferably, the chiller should be adjusted to achieve a platen surface temperature of about 35-60° F. In general, colder platen surface temperature values will allow for faster mat cooling rates. However, operating with chiller temperatures that are less than 32° F. can result in the accumulation of ice, which can present processing complications.

In general, mats need to be cold-pressed for a time period that is sufficient to cause the plastic in the mat that became molten in the hot-pressing event to congeal (e.g., freeze) during the cold-pressing event. When polyethylene is used in the mat as the primary binder, then the core of the mat should be cooled to a temperature of about 190-200° F. during the cold-pressing event. Panels can be made with cold-pressing times that are associated with higher core temperature values as the mat exits the cold-press, but the resulting panels will potentially have lower strength and greater variance in caliper. The time required to achieve sufficient cooling will be dependent upon the thickness of the mat, the density of the mat, the composition of the mat, and the temperature of the cold press platens. The time required to achieve sufficient cooling will also depend upon the temperature of the mat after hot-pressing.

The described embodiments result in the following surprising and unexpected benefits. Heating the mat to a temperature of 260-340° F. without evaporating all of the water in the mat results in shorter hot-pressing periods that are required to reach core temperature targets than that which would be experienced if all of the water in the mat was being evaporated during hot-pressing. Rapidly lowering the mat temperature immediately after hot-pressing results in shorter cold-pressing periods that are required to reach core temperature targets during cold-pressing. These very important and dramatic improvements in processing rate are achieved without the need for harsh chemicals or extreme processing conditions.

Referring now to FIG. 1, an example composite board 100 is shown, in accordance with some embodiments of the present disclosure. Composite board 100 may be manufactured to operate as a roof cover board that can provide impact protection (from hail, foot traffic, and/or heavy equipment), temporary water resistance, fire resistance, wind-uplift constraint, thermal dimensional stability, and/or flexibility that is often required in roofing applications. Composite board 100 may be manufactured to be receptive to adhesives and/or mechanical fasteners.

Composite board 100 may comprise three discrete layers, a top surface layer 102, a bottom surface layer 104, and a core layer 106. Top surface layer 102 may be about 0.005-0.050" thick and may comprise of either paper or a fiberglass web. Bottom surface layer 104 may be about 0.005-0.100" thick and may comprise of paper, a fiberglass web, nylon film, polyester film, cellulose acetate film, nylon or polyester non-woven fabrics, and/or textiles, such as those based on cotton. Core layer 106 may be about 0.100-1.500" thick and comprise discrete paper fragments and plastic fragments such as polypropylene or polyethylene fragments, which may be connected through the use of a thermoplastic bonding resin, including polyethylene.

The bonding resin may be attached in a random pattern to less than 100% of the paper fragment and polypropylene fragment surface area. The paper fragments may be shaped as irregular plates with a diameter of about 0.050-2.000" and a thickness of about 0.005-0.050". The polypropylene fragments can have multiple shape types, some of which are irregular. In some embodiments, the largest dimension of the polypropylene fragments may be about 2.000", while the smallest dimension may be about 0.050". The thickness axis of the paper fragments may be generally oriented orthogonally to the plane of the board article. The two different fragment types may be uniformly distributed in the core layer relative to each other. The level of paper fragments in the core layer may be about 30-70% on a mass basis. The level of polypropylene fragments in the core layer may be about 5-30%. The level of thermoplastic bonding resin in the core layer may be about 10-60%. The density of the core layer can be about 35-70 pcf. Thus, the core layer may include small voids in and around the particles, which could improve flexibility. The core layer may be attached to the top and bottom surface layers by use of a thermoplastic adhesive, including polyethylene or polypropylene.

The structure of composite board 100 may be designed to achieve compression load support, sudden impact resistance, wind uplift resistance, fastener retention, adhesive compatibility, temporary rain protection, low flame spread, thermal dimensional stability, and an exceptional level of mechanical flexibility. The design promotes rapid and easy installation of the cover board in a commercial low slope roof application. It may be especially advantageous in re-roofing applications due to its level of flexibility, which may allow it to more easily conform to the curved contour of the perimeter region of the roof. The top major surface may allow for the absorption of adhesives but may temporarily resist transfer of rainwater into the core layer of the board.

Figure 2:
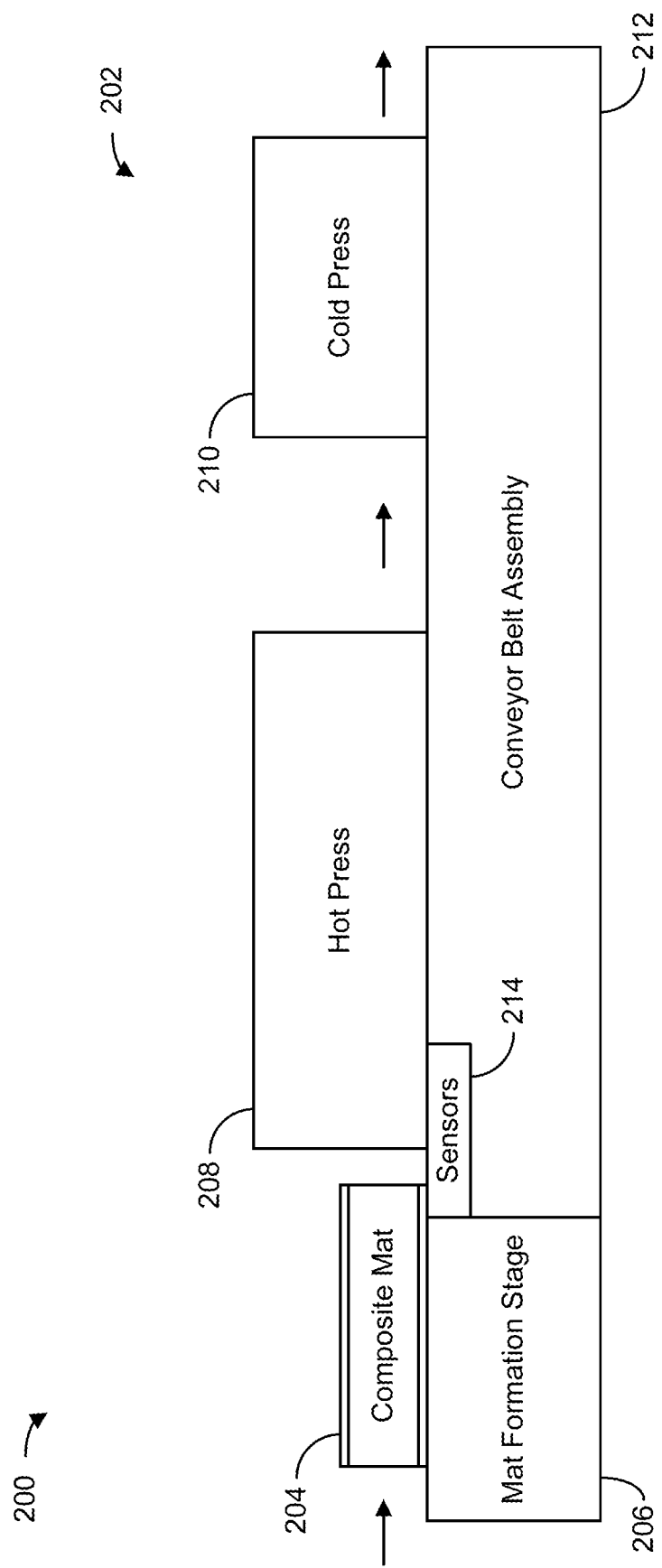
FIG. 2 is a block diagram of a composite board manufacturing system, in accordance with some embodiments of the present disclosure.

Referring now to FIG. 2, a block diagram of a composite mat manufacturing system 200 is shown, in accordance with some embodiments of the present disclosure. Composite mat manufacturing system 200 may include a manufacturing apparatus 202 and a composite mat 204. Composite mat 204 may be similar to composite board 100, shown and described with reference to FIG. 1. As illustrated, composite mat 204 may be fed into different stages of manufacturing apparatus 202. Such stages may include a mat formation assembly stage 206, a hot press 208, and a cold press 210. Manufacturing apparatus 202 may be configured to move composite mat 204 between the different stages via a conveyor belt assembly 212 to form a composite board. For example, using a conveyor belt, conveyor belt assembly 212 may move composite mat 204 from mat formation assembly stage 206 to hot press 208 and then to cold press 210. Conveyor belt assembly 212 may output composite mat 204 as a composite board after composite mat 204 is cooled and its contents congealed in cold press 210. Once cooled, composite mat 204 may be a composite board that can be used for various roofing and/or siding applications.

Before composite mat 204 can be provided to manufacturing apparatus 202, the materials to create composite mat 204 may be created. For example, fragments of paper and polypropylene may be generated by feeding relatively large sheets of paper and relatively large articles of polypropylene into a mill, which may mechanically disintegrate the paper and polypropylene into fragments. The mill may be equipped with a screen that has a mesh size of about 1". Thus, paper fragments and polypropylene fragments that are being processed inside of the mill may continue to be reduced in size until they are able to pass through the screen. In this manner, fragments may be generated that have a size of about 1" or less. If desired, a smaller or larger mesh size could be used to yield smaller or larger fragments. Optionally, thermoplastic adhesive could be processed through the mill as well. Different mills could be used for each of the fragment types or they could be processed together through the same mill. When a single mill is used, there may be a tendency for the three components to be mixed together. Additional mixing can be achieved by processing the components through a secondary blender. The secondary blender may allow for the convenient application of additional adhesives and/or other functional additives. The secondary blender may be especially beneficial for the introduction of liquid additives or additives that need to be uniformly distributed within the core furnish. Optionally, the paper fragments only or the mixture of paper fragments and polypropylene fragments can be processed through a dryer prior to the secondary blender. The blended core furnish may then be conveyed to mat formation assembly stage 206.

A mat formation assembly stage 206 may comprise a wooden or plastic platform on which composite mats may be created by various mechanical devices. For instance, on mat formation assembly stage 206, a bottom layer fabric (4" wide or greater) may be unwound onto a horizontal conveyor belt of conveyor belt assembly 212, which may convey the bottom layer fabric in a forward direction. An adhesive may be applied to the top side of the bottom layer fabric. The adhesive could exist as a film or it could be a liquid, which could be applied as a spray, or a curtain, or it could be flood coated. Alternatively, the adhesive could be a thermoplastic that is applied to the bottom layer fabric in an extrusion process. The blended core furnish may be deposited on top of the previously applied adhesive. The basis weight of the core furnish may be about 1.5-2.5 lb/ft$^2$. Rakes or other devices can be used to ensure that the deposited core furnish is uniformly distributed at the targeted basis weight. More adhesive may be applied to the top side of composite mat 204. A top layer fabric (48" wide or greater) may be unrolled and positioned over the adhesive that was previously applied to composite mat 204. In some cases, the resulting layered assembly will be processed through opposing rolls in order to compact it.

Composite mat 204 may then be conveyed into hot press 208. Hot press 208 may comprise two hot-platens that are spaced apart and may be configured to move towards each other to exert pressure on composite mats that are positioned between the platens. The two hot-platens may be heated using various heating methods (e.g., via electricity, which can power heating elements, or use of circulating hot oil, which can be heated by combustion of natural gas or other fuels). The hot-platens may each be heated to have a surface temperature between about 320-450° F. Hot press 208 may be configured to exert a pressure of about 20-800 lb/in$^2$ on composite mat 204 for a period of about 2-10 minutes as conveyor belt assembly 212 moves composite mat 204 between the stages of manufacturing apparatus 202. The applied pressure may be constant. By applying such pressure, hot press 208 may cause the thickness of composite mat 204 to decrease. However, in some embodiments, the hot press 208 may be configured to hold the thickness of composite mat 204 to a constant value. To do so, hot press 208 may initially apply a relatively high pressure to composite mat 204, such as 600-800 psi, and gradually decrease the applied pressure to about 50 psi, or even lower, as the pressing event continues. In some embodiments, hot press 208 may apply pressure in two stages. In a first stage, hot press 208 may apply pressure using a position-controlled method to form a composite mat to a desired thickness (e.g., a target thickness). In a second stage, hot press 208 may maintain a constant predetermined pressure on composite mat 204.

In general, the gap between the top and bottom platens during pressing can be in the range of about 0.25-1.00". In one example, a preferred gap between the platens is about 0.50" when the basis weight of the core furnish in the assembly is about 1.8-2.4 lb/ft$^2$. If the moisture content of composite mat 204 is greater than about 4-5%, then venting cycles might be needed during the hot-pressing process. Upon exiting hot press 208, conveyor belt assembly 212 may move composite mat 204 through a transition phase in which composite mat 204 is not heated, cooled, or compressed for a short time period. The composite mat would thereafter be immediately transferred into cold press 210.

In cold press 210, the hot, compacted composite mat 204 may be processed to freeze or congeal the thermoplastic components of composite mat 204. Cold press 210 may comprise two cold-platens that are spaced apart and may be configured to move towards each other to exert pressure to cool and shape composite mats that are positioned between the platens. The two cold-platens may be cooled using conventional cooling methods (e.g., cooling fluids being circulated through chillers or similar refrigeration devices). The two cold-platens may be configured to have top and/or bottom platen surface temperature values of about 30-80° F. The pressure in the cold press may be maintained at about 5-25 psi. The gap between the platens may be equal to a stored target thickness for the resulting board. The cold press time may be about 2-10 minutes, which may be sufficient to cool composite mat 204 throughout its thickness to a temperature of less than about 190° F. In some embodiments, composite mat 204 may be cooled to a temperature of less than about 110° F. prior to exiting cold press 210.

Subsequent to cold pressing, composite mat 204 can be cut into boards, such as boards having a dimension of 4' wide×8' long, which may be useful for a roof cover board application. Boards can be stacked, treated with edge sealant, banded, and packaged. Composite mat compositions and methods of forming such composite mats are further described in U.S. patent application Ser. No. 17/069,567.

In some embodiments, composite mat manufacturing system 200 may include sensors 214. Sensors 214 may include depth sensors, pressure sensors (e.g., pressure transducers), temperature sensors, moisture sensors, or any other type of sensors. Sensors 214 may be coupled to manufacturing apparatus 202 at any location. Sensors 214 may be configured to detect data about composite mats as such mats maneuver around composite mat manufacturing system 200 and/or before composite are compressed by hot press 208. Sensors 214 may detect data about the mats and transmit the data to a controller. As will be described below, the controller may receive the data and control hot press 208, cold press 210, and/or conveyor belt assembly 212, based on the data to ensure the respective composite mat is properly heated and cooled.

Figure 3:
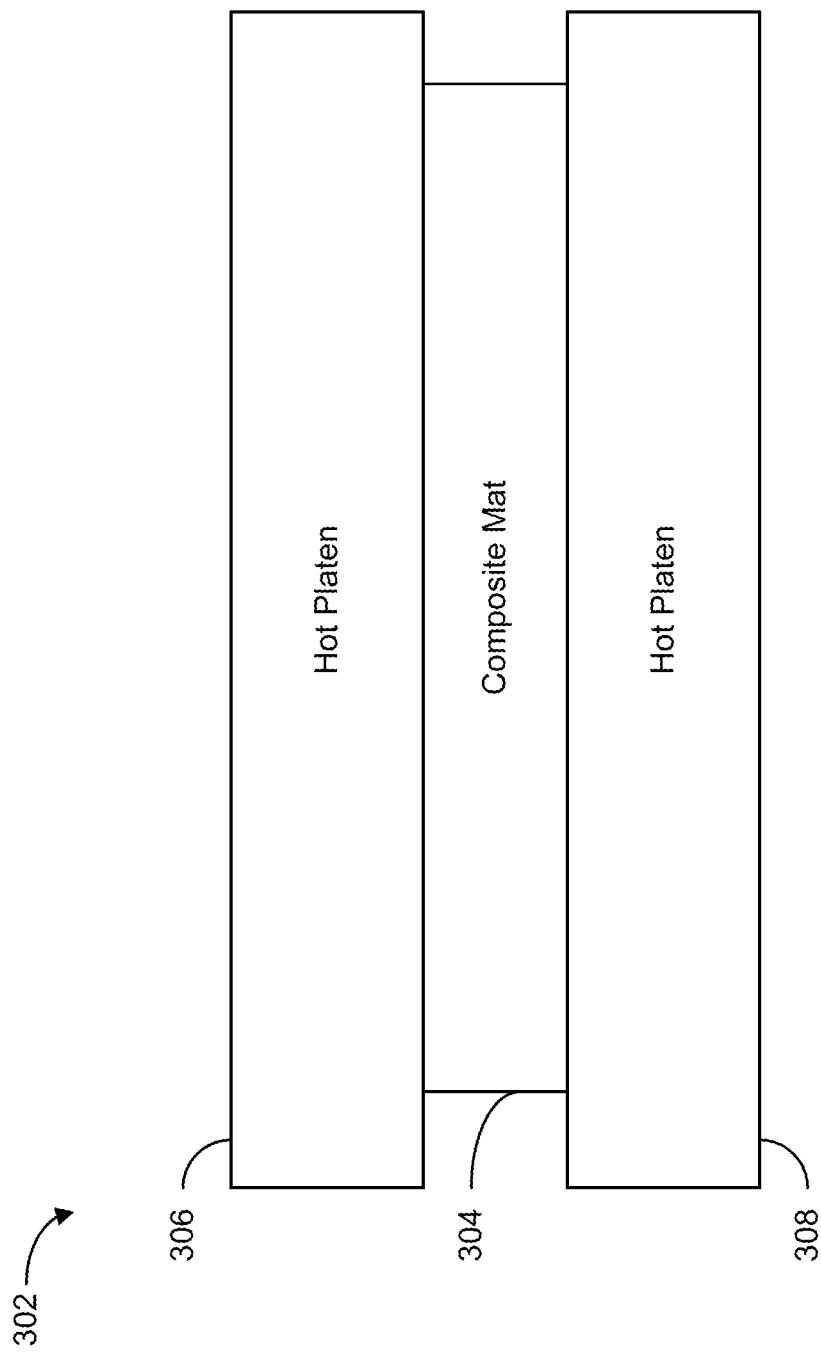
FIG. 3 is an illustration of a hot press compressing a composite mat, in accordance with some embodiments of the present disclosure.

Referring now to FIG. 3, a block diagram illustrating a hot press 302 compressing a composite mat 304 is shown, in accordance with some embodiments of the present disclosure. Hot press 302 may include hot-platens 306 and 308 as an opposing pair of hot platens. Hot press 302 may include any number of opposing pairs of hot platens. Hot press 302 may be operated by a controller (not shown) that is configured to cause hot-platens 306 and 308 to heat up and close in on each other to apply pressure and heat composite mat 304. The controller may cause hot press 302 to apply pressure and/or heat composite mat 304 for a predetermined amount of time. In some embodiments, the controller may detect when the predetermined amount of time is over and move hot-platens 306 and 308 further apart to release composite mat 304 so composite mat 304 may be removed from hot press 302. Alternatively, in some embodiments, the controller may be configured to move composite mat 304 along a conveyor belt at a rate that causes composite mat 304 to be compressed and heated for the predetermined amount of time before composite mat 304 exits hot press 302. In such embodiments, hot-platens 306 and 308 may remain on and heated as composite mats are pushed through hot press 302 via the conveyor belt. Although not shown, the controller may similarly control a cold press including any number of pairs of opposing cold platens to cool and/or shape composite mat 304 for a predetermined amount of time, in some cases after hot press 302 heats composite mat 304.

Figure 4:
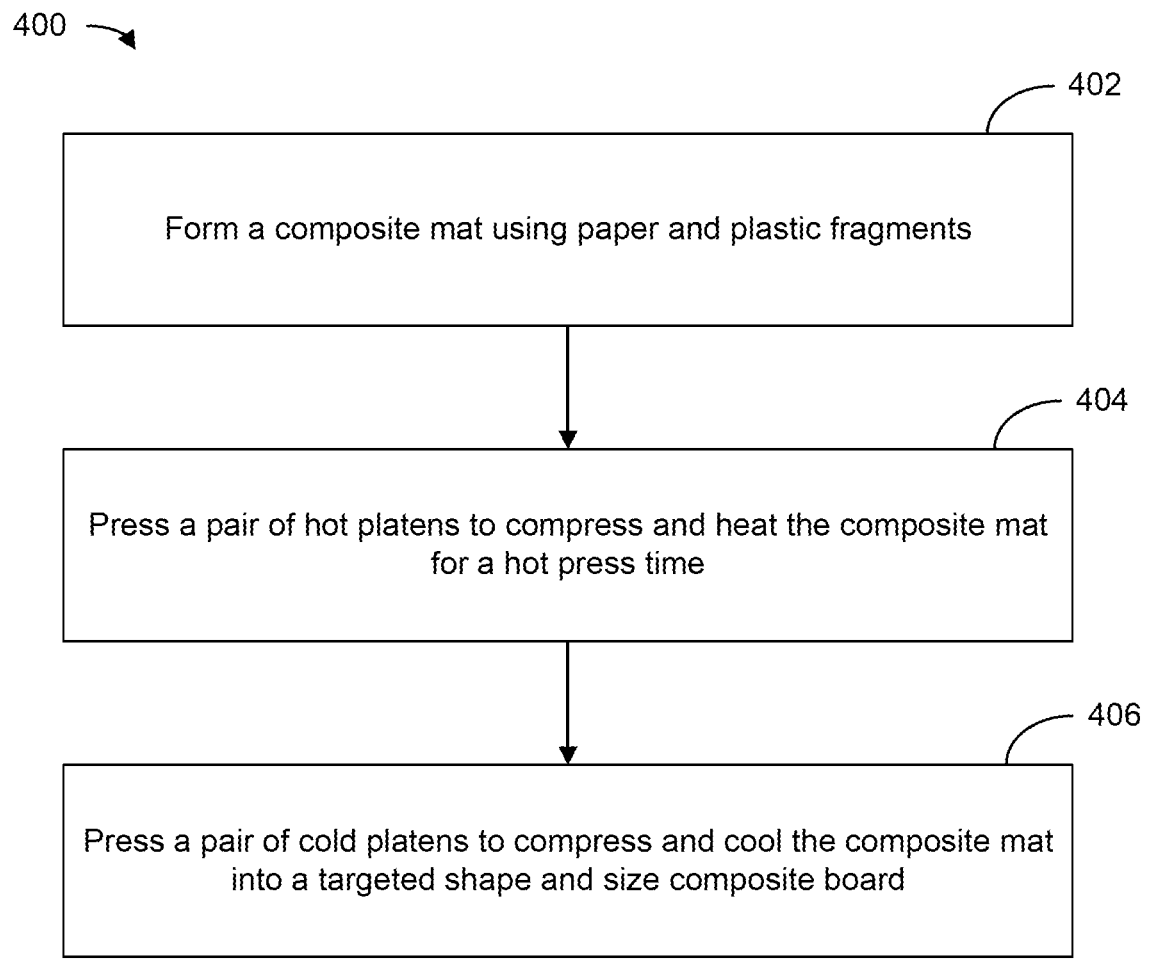
FIG. 4 is a flow diagram of an example process for forming a composite mat into a composite board, in accordance with some embodiments of the present disclosure.

Referring now to FIG. 4, a flow diagram of an example process 400 for forming a composite mat into a composite board is shown, in accordance with some embodiments of the present disclosure. Process 400 can be performed using a manufacturing apparatus (e.g., manufacturing apparatus 202). Process 400 may include more or fewer operations and the operations may be performed in any order. Performance of process 400 may enable the manufacturing apparatus to manufacture, from waste materials, a composite board that can be used for roofing and/or siding.

An operation 402 may include forming a composite mat using paper and plastic fragments. The paper and plastic fragments may be created by sending paper and plastic material through a shredder. The paper and plastic fragments may be placed between two solid surfaces (e.g., plexiglass and/or paper) and placed onto a horizontal conveyor belt of the manufacturing apparatus. For example, a bottom layer fabric may be unwound onto the conveyor belt, which may convey the bottom layer fabric in a forward direction. An adhesive may be applied to the top side of the bottom layer fabric. The blended core furnish comprising the paper and plastic fragments may be deposited on top of the applied adhesive. Rakes or other devices can be used to ensure that the deposited core furnish is uniformly distributed at the targeted basis weight. More adhesive may be applied to the top side of the core furnish. A top layer fabric may be unrolled and positioned over the adhesive on the top side of the core furnish.

At an operation 404, the composite mat may be conveyed into a hot press of the manufacturing apparatus and the hot press may press a pair of hot-platens to compress and heat the composite mat for a hot press time. The hot press may be configured to exert a predetermined amount of pressure on the composite mat as a conveyor belt of the manufacturing apparatus moves the composite mat through the hot press. In some embodiments, the manufacturing apparatus may not include a conveyor belt, and may instead include an opening into which a user may insert the composite mat. The hot press may compress and heat the composite mat for a predetermined amount of time (e.g., based either on the length of the hot-platens and speed of the conveyor belt carrying the composite mat, or a time determined based on the characteristics of the composite mat). The time may be stored in memory of a device or controller that is operating the manufacturing apparatus and may correspond to different mat compositions and/or thicknesses. For example, different mat compositions and/or thicknesses and corresponding times in which they need to be heated to reach a target core temperature may be stored in memory. The controller may receive data (either from sensors or via a user input) and compare the data to the different mat compositions and/or thicknesses in memory using a look-up table. The controller may identify the times that match the mat compositions and/or thicknesses and control a conveyor belt to heat the mat for the time or to otherwise release the mat after the time expires. Upon exiting the hot press (either via the moving conveyor belt or a user that manually removes the composite mat), the composite mat may be moved into the cold press of the manufacturing apparatus to be cooled.

At an operation 406, the composite mat may be conveyed into the cold press of the manufacturing apparatus and the cold press may press a pair of cold-platens to cool and shape the composite mat into a composite board. The cold press may be configured to exert a predetermined amount of pressure on the composite mat as the conveyor belt of the manufacturing apparatus moves the composite mat through the cold press. In some embodiments, the manufacturing apparatus may not include a conveyor belt, and may instead include an opening into which a user may insert the composite mat. The cold press may compress, cool, and/or shape the composite mat for a predetermined amount of time (e.g., based either on the length of the cold-platens and speed of the conveyor belt carrying the composite mat, or a time determined based on the characteristics of the composite mat). In some embodiments, subsequent to cold pressing, the composite mat can be cut into boards which may be useful for a roof cover board application.

Figure 5:
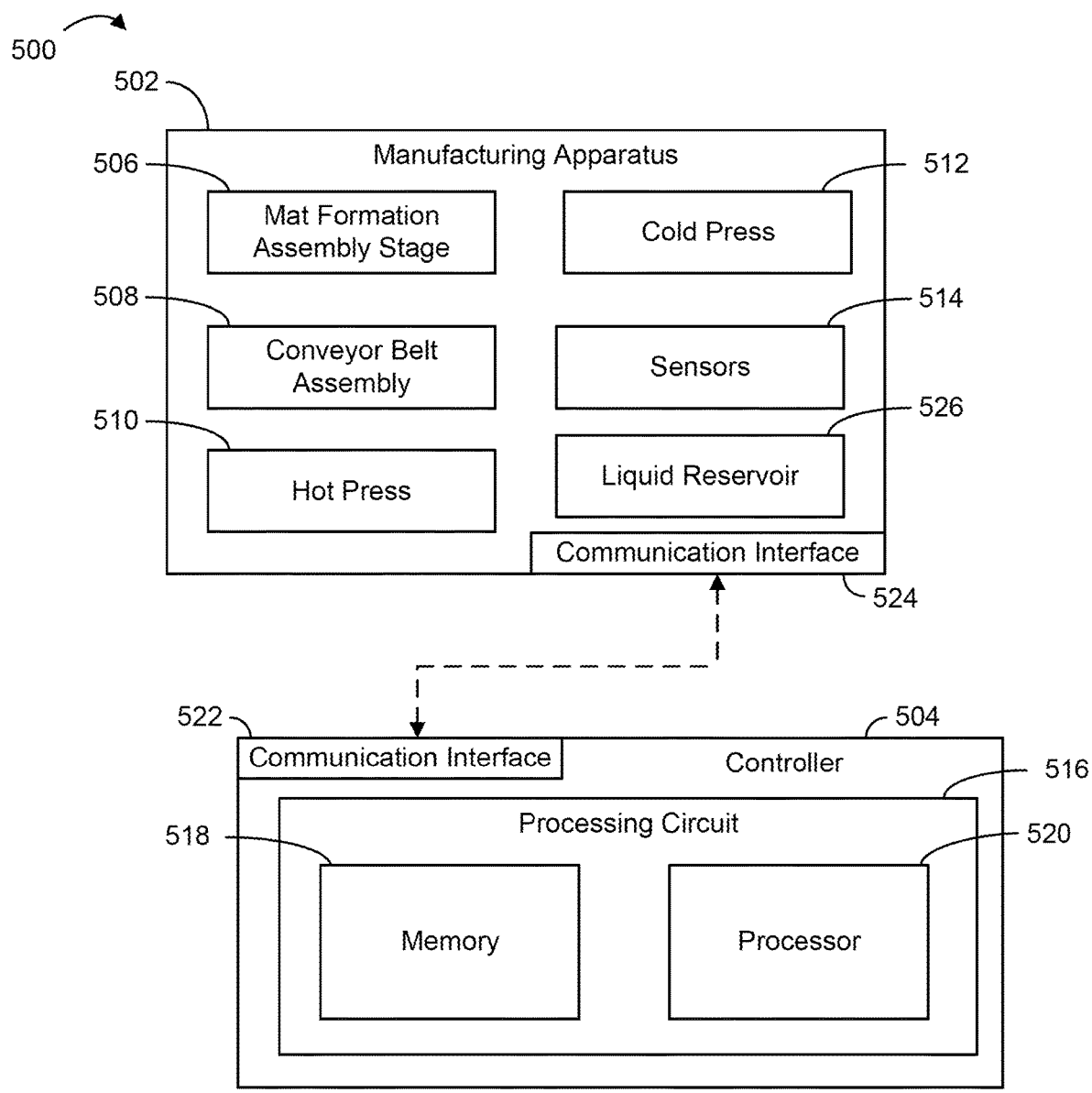
FIG. 5 is a block diagram of a composite board manufacturing system, in accordance with some embodiments of the present disclosure.

Referring now to FIG. 5, a block diagram of a composite board manufacturing system 500 is shown, in accordance with some embodiments of the present disclosure. Composite board manufacturing system 500 may include a manufacturing apparatus 502 and a controller 504. Controller 504 may be a component of manufacturing apparatus 502 (e.g., a processor and/or display coupled to manufacturing apparatus 502) or may be external to manufacturing apparatus 502. Manufacturing apparatus 502 may include a mat formation assembly stage 506, a conveyor belt assembly 508, a hot press 510, a cold press 512, and sensors 514. Manufacturing apparatus 502 and its respective components 506-514 may be similar to manufacturing apparatus 202, shown and described with reference to FIG. 2. Controller 504 may be configured to operate manufacturing apparatus 502 to manufacture composite mats. In some instances, controller 504 may receive sensor data from sensors 514 that indicate one or more characteristics of a composite mat and adjust the operation of manufacturing apparatus 502 based on the sensor data (e.g., adjust a speed of a conveyor belt of conveyor belt assembly 508, a temperature of hot press 510, a temperature of cold press 512, etc.).

Controller 504 may include a processing circuit 516 and a communication interface 522. Processing circuit 516 may include a memory 518 and a processor 520, in some embodiments. Processing circuit 516 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. Processor 520 may include an ASIC, one or more FPGAs, a DSP, circuits containing one or more processing components, circuitry for supporting a microprocessor, a group of processing components, or other suitable electronic processing components. In some embodiments, processor 520 may execute computer code stored in memory 518 to facilitate the activities described herein. Memory 518 may be any volatile or non-volatile computer-readable storage medium capable of storing data or computer code relating to the activities. According to an exemplary embodiment, memory 518 may include computer code modules (e.g., executable code, object code, source code, script code, machine code, etc.) for execution by processor 520.

Communication interface 522 may communicate with a communication interface 524 of manufacturing apparatus 502 via any synchronous or asynchronous network. Communication interface 522 may include one or more communication interfaces that can communicate with the components of manufacturing apparatus 502. For example, controller 504 may receive data from sensors 514 and/or control conveyor belt assembly 508, hot press 510, and/or cold press 512 via communication interface 522. Based on such sensor data and via communication interface 522, controller 504 may transmit signals to the manufacturing apparatus 502 or devices (e.g., actuators or controllers) that operate the individual components 506-514 to cause manufacturing apparatus 502 to form composite mats and move the composite mats on conveyor belt assembly 508 (e.g., by moving a conveyor belt of conveyor belt assembly 508) through hot press 510 and/or cold press 512 and/or change a position of the platens (e.g., open or move closer together) of hot press 510 and/or cold press 512.

Upon a composite mat being assembled at mat formation assembly stage 506 and/or placed on any component of manufacturing apparatus, processor 520 may detect the composite mat and characteristics of the mat. The composite mat may contain plastic and cellulose components such as paper and plastic fragments, as described herein, and/or liquid content (e.g., water, milk, alcohol, soft drinks, etc.). In cases in which the liquid is water, water may be any aqueous solution in which water is the solvent and that is diluted with any materials such as salt, sugar, or any other materials. In some cases, the water may be a component or an ingredient of a liquid in the composite mat. Processor 520 may detect the composite mat based on a user input and/or based on sensor data that indicates the composite mat has been placed on manufacturing apparatus 502 (e.g., on composite mat formation assembly stage 506, a conveyor belt assembly, or between a pair of opposing hot-platens). In some embodiments, the user input and/or the sensor data may further indicate a current thickness or a desired thickness, a mat composition (e.g., percentage of liquid, plastic, paper, or other materials), and/or a moisture content of the composite mat. Processor 520 may receive the sensor data and operate the manufacturing apparatus to create a composite board that can act as roofing or side paneling as described below.

Processor 520 may determine whether the composite mat has a liquid content that exceeds a threshold. Using the sensor data and/or a user input, processor 520 may determine an amount of liquid (e.g., moisture) that is in the composite mat and/or a percentage of the composite mat that is made up of liquid. Processor 520 may retrieve a stored threshold (e.g., 3%) or a water or liquid content threshold, from memory 518 and compare the determined amount of liquid or percentage to the threshold to determine if the amount of liquid exceeds the threshold. In some cases, processor 520 may determine if the amount of liquid is within a predetermined range (e.g., 3%-25%).

In some embodiments, responsive to determining the amount of liquid does not exceed the threshold or is not within the predetermined range, the data processing system may transmit a signal that causes a liquid reservoir 526 to release liquid onto the composite mat. Liquid reservoir 526 may be a water reservoir and may contain liquid such as water, as defined above, or any other liquid. Processor 520 may transmit a signal to a device (e.g., an actuator) that controls a position and/or orientation of liquid reservoir 526 to cause liquid reservoir 526 to pump, discharge, spray or otherwise release liquid onto the composite mat to cause the composite mat to contain enough liquid to be above the threshold or be within the range. In some embodiments, processor 520 may determine a difference or a distance between the amount of liquid in the mat and the threshold or the range (e.g., by comparing the amount of liquid to the threshold). In such embodiments, processor 520 may control the positioning of liquid reservoir 526 to release enough liquid onto the composite mat to reach the threshold or range and then stop liquid reservoir 526 from releasing the liquid. Thus, liquid reservoir 526 does not need to be refilled at each instance that liquid reservoir 526 releases liquid onto a composite mat and can instead be used to add liquid to composite mats during multiple instances. By implementing such methods, processor 520 can ensure composite mats contain enough liquid to be cooled during a state change from a superheated state to a gaseous state.

Processor 520 may cause a pair of opposing hot-platens of the manufacturing apparatus to compress and heat a composite mat for a predetermined time period to a target thickness. The target thickness may be a target thickness for a first stage of compressing and heating the composite mat. For example, processor 520 may cause the pair of opposing hot-platens to heat and melt the components of the composite mat to minimize the mat's thickness. Processor 520 may do so using a "position-controlled" method in which processor 520 retrieves a pattern of position data from memory 518 and controls the positions of the pair of hot-platens using the pattern of position data for a predetermined time period. The pattern of position data may include the predetermined time period and predetermined distances between the platens at times within the time period. Processor 520 may control the platens to be at the corresponding positions throughout the time period specified in the pattern of position data. In one example, the pattern of position data may only include one position. Sensors 514 may include sensors that detect the position of the hot-platens. The sensors may send data to processor 520 indicating the current position and processor 520 may transmit signals to cause the hot-platens to maintain the position identified in the pattern of position data. Processor 520 may similarly control the positions of the hot-platens for any positions of a position pattern. Through the position-controlled method, processor 520 may heat and compress the composite mat into the target shape and/or thickness without taking any pressure data into account.

In some embodiments, processor 520 may retrieve position data based on a current thickness of the mat and/or a target thickness for the mat. For example, processor 520 may receive sensor data and/or a user input that indicates a current thickness and/or a target thickness for the composite mat. Processor 520 may use one or both of the thicknesses in a look-up table stored in memory 518 to identify the position data to use to control the positions of the hot-platens to form the composite mat into the target thickness. By using predetermined patterns to form a composite mat shape, the data processing may ensure the hot-platens can create the composite mats without applying too much pressure and deforming the composite mats (or breaking the manufacturing apparatus) or too little pressure and allowing too much superheated liquid within the mat to escape as gas (e.g., steam).

Processor 520 may receive indications of pressure the pair of opposing hot-platens exerts while compressing the composite mat from a pressure sensor (e.g., a pressure transducer). Processor 520 may receive such pressure data during another time period in which processor 520 controls the positions of the hot-platens based on the pressure that the hot-platens are exerting on the composite mat. Processor 520 may receive the pressure indications from the pressure sensors as the hot-platens heat and compress the composite mat and use the pressure indications to control the positions of the hot-platens. For example, at the end of the time period in which processor 520 controls the hot-platens using the position-controlled method, processor 520 may use a "pressure-controlled" method to control the positions of the hot-platens. To do so, processor 520 may retrieve a target pressure (e.g., 50 psi), a pressure threshold, or a pressure range from memory 518. Processor 520 may determine whether the pressure indications exceed or are within a predetermined range of the target pressure, threshold, or range by comparing the pressure indications to the respective target.

Responsive to determining the pressure indications do not exceed or are not within a predetermined range of the target pressure, processor 520 may determine new hot-platen positions for the hot-platens. Processor 520 may determine a magnitude and/or a direction that the pressure is from the target pressure and determine a new position for the hot-platens to increase or decrease the pressure to reach the target pressure according to the magnitude and/or direction. Processor 520 may adjust the positions of the hot-platens using the determined positions by transmitting signals that cause the hot-platens to either further close in on the composite mat to increase the applied pressure or release the hot-platens to apply less pressure. Because the target pressure may be a pressure that allows the liquid within the composite mat to superheat without changing states into a gas, by adjusting the positions of the hot-platens to apply such pressure, processor 520 may enable the composite mat to be heated at a constant pressure without turning the liquid contents of the mat into gas.

In some embodiments, processor 520 may use a position-controlled method to maintain the constant pressure on the composite mat throughout the time in which the composite mat is heated. For example, as described above, processor 520 may retrieve a position pattern from memory 518 that processor 520 may use to transmit position data to the devices controlling the position of the hot-platens. The positions of the position pattern may cause the platens to exert a constant or predetermined pressure on the composite mat as the materials within the mat melt. Because the amount of material within the mat that melts is predictable, the positions may correspond to a constant or predetermined pressure, thus enabling processor 520 to control the hot-platens to exert a constant or predetermined pressure on the hot-platens to superheat the liquid (e.g., water) until the mat is released from the pressure (e.g., from a position of the position pattern or from the conveyor belt moving the composite mat from the hot-platens).

Processor 520 may determine whether a pressing time period has expired. The pressing time period may be the time period in which the hot-platens press the composite mat under both the position-controlled first stage and the pressure-controlled second stage, only the pressure-controlled second stage, or only a position-controlled stage in which processor 520 heats the mat composite mat to the target temperature (e.g., in cases in which processor 520 maintains the constant pressure using position patterns instead of pressure data). The pressing time period may be a predetermined time period in which the hot-platens have been calculated to be able to heat the composite mat to a target temperature. The pressing time period may be controlled by a speed of the conveyor belt in embodiments in which the manufacturing apparatus includes conveyor belt assembly 508 (e.g., processor 520 may control the speed of the conveyor belt so composite mats remain between the hot-platen models for a predetermined time period) or a time in which the hot-platens apply pressure in embodiments in which the manufacturing apparatus is a static press without a conveyor belt. Processor 520 may compare an amount of time that the composite mat has been compressed to the pressing time period to determine whether the composite mat's core has been heated to the target temperature. Responsive to determining the mat's core has not reached the target temperature (or that the time period has not expired), processor 520 may repeatedly receive pressure data, compare the pressure data to the target pressure, and adjust the positions of the hot-platens to maintain the pressure within a range of the target pressure to ensure the hot-platens apply enough pressure on the composite mats so the liquid content can be superheated while the other components melt. The range may have upper and lower bounds, just an upper bound, or just a lower bound. For example, in some embodiments, the range may be or include pressures above 25 psi. Processor 520 may do so until the core or average temperature of the composite mat reaches the target temperature.

Once processor 520 determine the time period has expired, processor 520 may transmit a signal that causes the hot-platens to release the composite mat. The signal may be a signal that causes the conveyor belt to move the composite mat away from the hot-platens or a signal that causes the hot-platens to change positions away from the composite mat to create a gap between the composite mat and the platens or to otherwise minimize the amount of pressure the platens are applying.

Advantageously, by using a predetermined time period instead of temperature data to determine when to release the composite mat, processor 520 may accurately determine when the composite mat has been properly heated. It can be difficult to determine the temperature of composite mats using sensors because the outer surface of the mat may quickly be heated to the temperature of the hot-platens while the heat is transferred throughout the mat. Thus, sensors that take the temperature of the outer surface may not accurately indicate when the mat has been heated. Because it can be difficult to insert sensors into the composite mat to obtain a reading of the core temperature, processor 520 may use the predetermined time period to more accurately determine when to stop heating the mat.

Upon releasing the composite mat from the pair of opposing hot-platens, the liquid in the composite mat may change state from its liquid state to a gaseous state. The liquid may do so because the decrease in pressure may allow for the liquid to convert into a gas. For instance, for a liquid to boil (e.g., to change state from a liquid to a vapor) the vapor pressure of the liquid may exceed the ambient pressure of the liquid's environment. Because processor 520 controls the hot-platens to substantially increase the ambient pressure in the mat during pressing, the liquid may superheat and not turn into gas upon reaching its boiling point at normal pressure levels (e.g., one atmosphere). By releasing the composite mat, processor 520 may cause the pressure placed on the composite mat to be closer to the normal pressure levels, reducing the boiling point of the liquid within the mat without decreasing its temperature, causing the liquid to almost instantaneously convert into a gas upon relieving the pressure.

Advantageously, the conversion of the liquid within the mat to a gas may cause the mat to lose a large amount energy, and thus reduce its temperature. For instance, an emission of steam from the mat can be clearly observed at the end of the hot-pressing event when panels are made in accordance with this disclosure. This phase change requires about 2,258 Joules of energy per gram of water. For example, in some cases, an initial temperature decrease at the center of the mat can be as high as about 40-60° F. At a temperature of 300° F., a mat comprised predominantly of a mixture of paper and polyethylene has a specific heat capacity of about 1 J/g/F. Thus, removing 1 J/g of energy results in a temperature decrease of about 1° F. If 2% of the mat, by mass, is superheated water at the end of the hot-pressing cycle, and all of this superheated water is immediately converted to steam, which is emitted from the panel, then the expected temperature decrease would be about 45.2° F. This relationship is illustrated with the equation below:

$$\Delta T = \frac{(L)\left(2258 \frac{J}{g}\right)}{1.0 \frac{J}{gF}}$$

where L is the liquid percentage of the mat when the mat is released from the hot-platens. Thus, the degree of the instantaneous temperature decrease will be proportional to the amount of superheated water that can be retained in the mat at the end of the pressing cycle.

Processor 520 may cause a pair of opposing cold-platens of the manufacturing apparatus to compress and cool the composite mat to a second target temperature. The second target temperature may be a temperature (e.g., 138° F.) in which the mat's contents freeze or congeal after melting under the hot-platens pressure and temperature. Processor 520 may transmit a signal to a device (e.g., an actuator or a controller) that operates cold-platens to compress and cool the composite mat to the second target temperature before the cold-platens release the composite mat. In some embodiments, processor 520 may transmit a signal to the conveyor belt to cause the conveyor belt to move the composite mat through the cold-platens. In such embodiments, processor 520 may control the speed of the conveyor belt so the cold-platens may remain at a cool temperature and at a constant position while the composite mat moves through the platens. Processor 520 may control the speed so, by the time the composite mat exits the cold-platens, the composite has cooled to the second target temperature.

Advantageously, by using the systems and methods described herein and in embodiments in which processor 520 controls the speed of the conveyor belt, the manufacturing apparatus may be created to be shorter (e.g., have shorter cold-platens) and/or processor 520 may cause the conveyor belt to move faster through the cold-platens while still enabling composite mats to be adequately cooled. The sudden cooling technique may minimize any gradient heating that typically occurs after composite mats leave the hot-platens and/or cause a sudden drop in composite mat temperature that may significantly reduce the amount of time that the composite mats need to be cooled. Thus, the systems and methods enable more composite mats to be manufactured more quickly and while requiring less space to do so.

In some embodiments, the hot-platens and/or cold-platens may be curved to relieve the pressure that causes the liquid within the composite mat to superheat. For example, the hot-platens may be curved upward at an end of the hot-platens that is proximate to the cold-platens. In such embodiments, the conveyor belt may move a composite mat so the hot-platens may exert a constant pressure as the composite mat moves between the hot-platens to execute the sudden cooling effect described herein. The conveyor belt may move the composite mat at a speed that enables the center of the composite mat to heat to a target temperature before the hot-platens curve upwards. Subsequent to reaching the target temperature, the conveyor belt may continue moving the composite mat. Upon reaching the point that the hot-platens curve upwards, the pressure being applied to the mat may be relieved or released. Thus, the curve may mechanically enable the sudden cooling effect without requiring a controller to send a signal to move the hot-platens up or down, enabling the hot-platens to remain in one position while heating multiple composite mats in sequence.

Moreover, in some embodiments, the cold-platens may be similarly curved at a proximate end to the hot-platens. In such embodiments, the cold-platens may be immediately next to the hot-platens so there is not a gap between the hot and cold-platens. Advantageously, in such embodiments, the composite mat may be suddenly cooled with the decrease in pressure caused by the curve in the hot-platens and then immediately cooled by the cold platens, enabling for composite mats to be cooled quicker, for shorter manufacturing apparatuses to be created, and for composite boards to be manufactured without sending signals to move the hot and/or cold-platens.

Figure 6A:
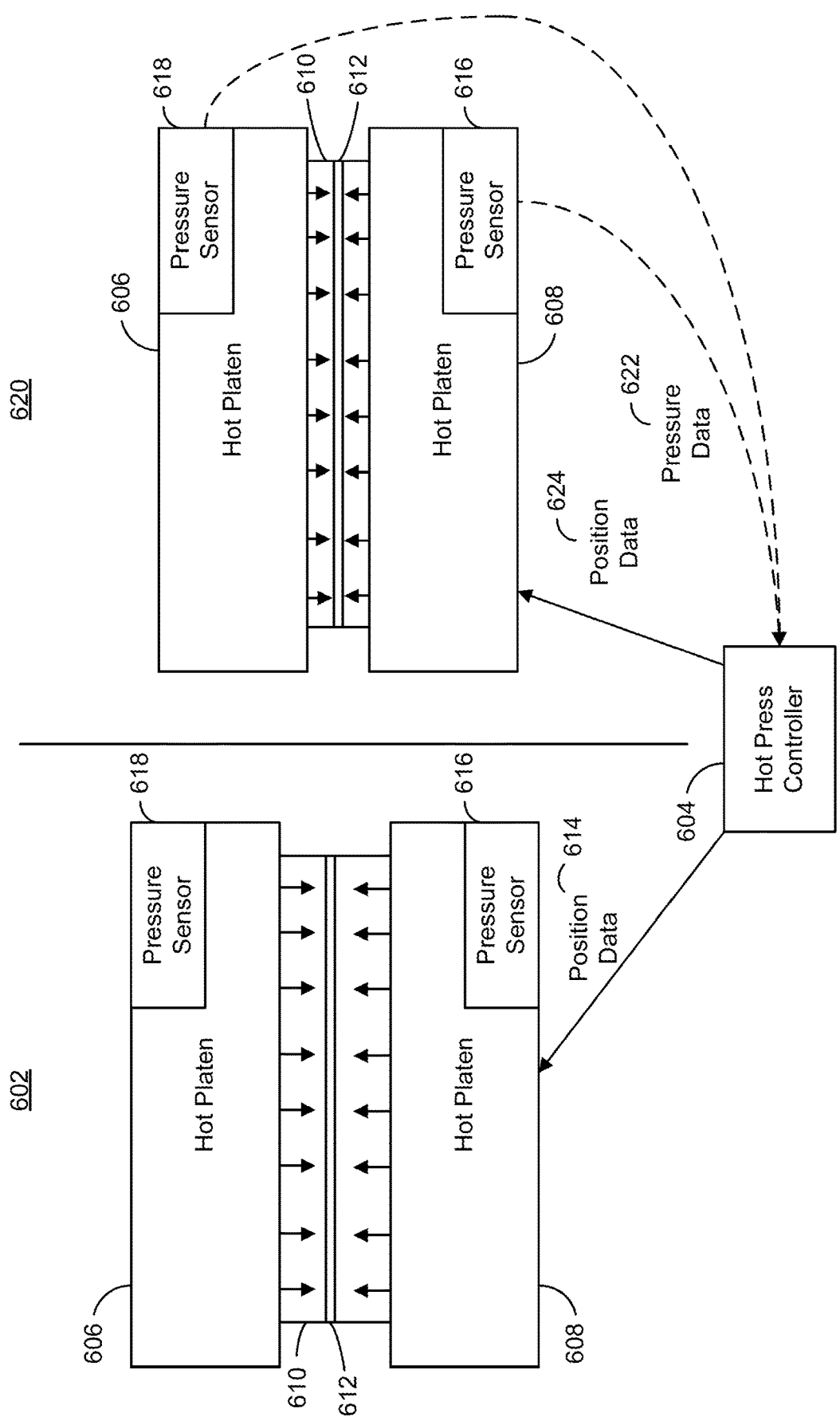
FIG. 6A is a block diagram illustrating a sequence of heating and compressing a composite mat using a hot press in two stages, in accordance with some embodiments of the present disclosure.

Referring now to FIG. 6A, a block diagram illustrating a sequence of heating and compressing a composite mat using a hot press in two stages is shown, in accordance with some embodiments of the present disclosure. In a first stage 602, a hot press controller 604 may control a position of hot-platens 606 and 608 of a hot press to heat and compress a composite mat 610 to a particular shape and/or thickness. Hot press controller 604 may be similar to controller 504, shown and described with reference to FIG. 5. Composite mat 610 may be a composite mat as described herein and include liquid content 612. Such liquid content may be or include liquid that was added to composite mat 610 to ensure composite mat 610 contained enough liquid for hot press controller 604 to implement the sudden cooling effect described herein and other liquid that is commonly found in landfill waste (e.g., from water bottles, paper fragments, soda bottles, milk cartons, or any other type of waste).

Hot press controller 604 may identify a thickness of composite mat 610 and retrieve a pressing pattern that corresponds to the thickness from memory. The pressing pattern may include different positions of hot-platens 606 and/or 608 over time while hot-platens 606 and 608 are compressing and heating composite mat 610. In one example, the pressing pattern may include a constant position that hot press controller 604 may maintain throughout a time period. Hot press controller 604 may transmit position data 614 that corresponds to the pressing pattern to a device controlling the positions of hot-platens 606 and 608. Hot press controller 604 may control the position data of hot-platens 606 and 608 so composite mat 610 is at a predetermined thickness at the end of a time period of the pressing pattern. In some embodiments, the predetermined thickness may be higher than a target thickness for the entire hot pressing event because the pressure hot-platens 606 and 608 exert during the next stage may cause composite mat 610 to become thinner (e.g., hot press controller 604 may control hot-platens 606 and 608 so composite mat 610 will have a thickness of 0.510" after first stage 602 and a thickness of 0.500" after a second heating stage).

Hot press controller 604 may control hot-platens 606 and 608 without receiving any data from pressure sensors 616 and/or 618. That being said, the positions of the pressing patterns may cause hot-platens 606 and 608 to exert a pressure that allows for hot-platens 606 and 608 to heat composite mat 610 so liquid content 612 can exceed a boiling point without converting to gas. The pressing pattern may do so because the patterns are associated with individual composite mat target thicknesses. For example, composite mats may lose thickness at a predictable rate as they are being compressed at a predetermined temperature. Thus, different target thicknesses may be associated with different positions. Hot press controller 604 may identify the positions of the pattern associated with a target 5/16" thickness at different timestamps during a hot press event in which the hot-platens are compressing a composite mat to have a 5/16" thickness and transmit position data 614 to change the position of hot-platens 606 and 608 at the positions of the corresponding timestamps. During this pressing process, sensors may continuously transmit position data to hot press controller 604 indicating the positions of hot-platens 606 and 608. Hot press controller 604 may receive the position data and control the positions of hot-platens 606 and 608 to be at the set positions based on the position data. Because the thickness of composite mat 610 is predictable, the positions may cause hot-platens 606 and 608 to apply a pressure that enables hot-platens 606 and 608 to superheat liquid content 612.

In a second stage 620, hot press controller 604 may control hot-platens 606 and 608 to compress and heat composite mat 610 using a pressure-controlled method. For example, after a time period in which hot press controller 604 operates the hot-platens 606 in first stage 602 is over, hot press controller 604 may control the hot-platens 606 and 608 based on pressure data 622 that hot press controller 604 receives from pressure sensors 616 and 618. Hot press controller 604 may be configured to cause hot-platens 606 and 608 to maintain a predetermined pressure on composite mat 610. Hot press controller 604 may receive pressure data 622 and compare the data to the predetermined pressure. Responsive to determining pressure data 622 is outside of a predetermined range of the predetermined pressure, hot press controller 604 may transmit position data 624 to the device controlling the positions of hot-platens 606 and 608 to move the position of hot-platens 606 and 608 to exert a pressure at the predetermined pressure or within the range. In some embodiments, the predetermined pressure and/or range may allow hot-platens 606 and 608 to heat composite mat 610 to a target temperature without boiling liquid content 612.

In some embodiments, hot press controller 604 may use a pressure-controlled control method to press and heat composite mat 610 during first stage 602. In such embodiments, hot press controller 604 may press composite mat 610 using a fixed pressure to cause composite mat 610 to have a fixed thickness. In some embodiments, hot press controller 604 may cause hot-platens to exert a constant pressure (e.g., a predetermined pressure or a pressure within a predetermined range) on composite mat 610 across both first stage 602 and second stage 620.

Figure 6B:
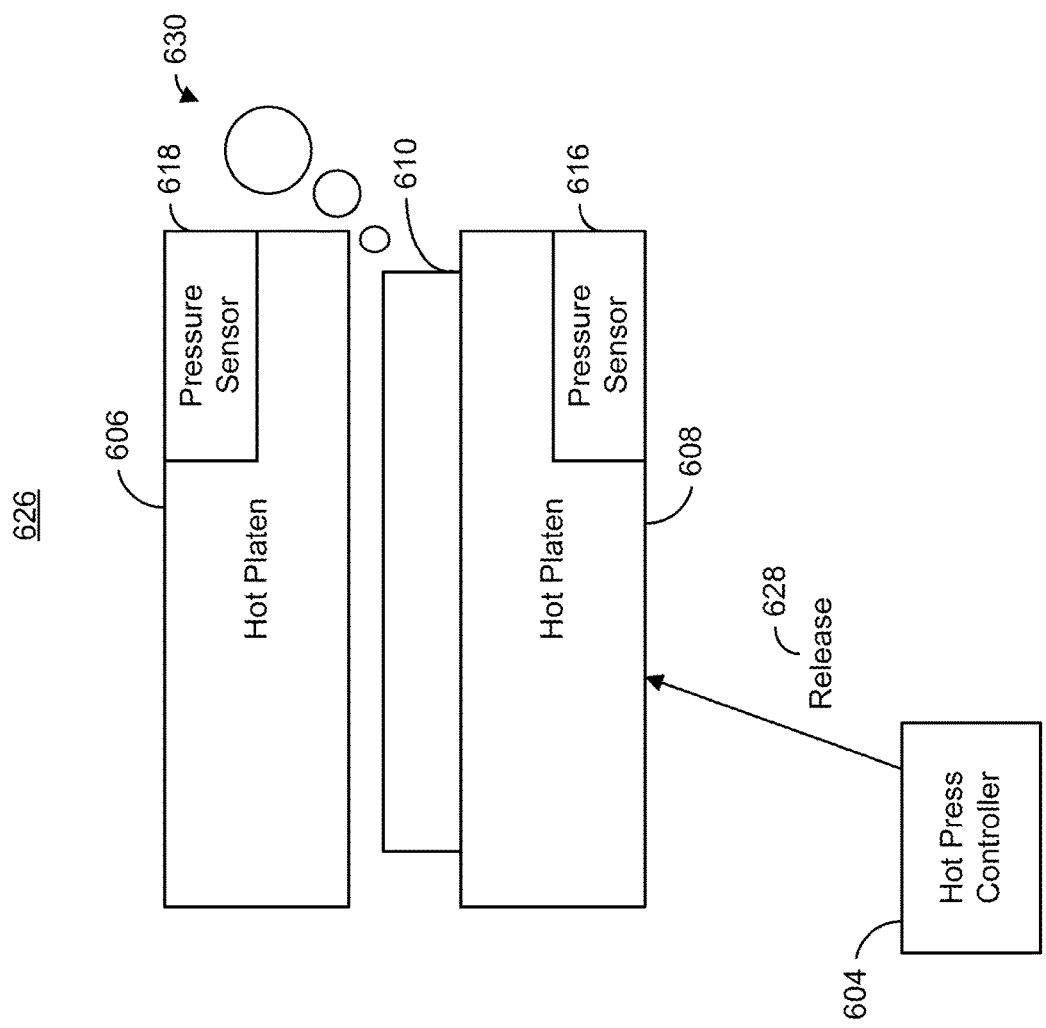
FIG. 6B is a block diagram illustrating a continuation of the sequence of FIG. 6A in which the composite mat is cooled using a sudden cooling technique, in accordance with some embodiments of the present disclosure.

Referring now to FIG. 6B, a block diagram illustrating a continuation of the sequence of FIG. 6A in which the composite mat is cooled using a sudden cooling technique is shown, in accordance with some embodiments of the present disclosure. The sequence may include a third stage 626 in which hot press controller 604 sends a release command 628 to cause hot-platens 606 and 608 to release composite mat 610 from the pressure sensors 616 and 618 were exerting on composite mat 610. The command may be a signal to the devices controlling the position of hot-platens 606 and 608 and/or a command to a conveyor belt assembly (not shown) that causes a conveyor belt moving composite mat to move composite mat through hot-platens 606 and 608. In some embodiments, because liquid content 612, shown and described with reference to FIG. 6A has been superheated upon composite mat 610 being released from hot-platens 606 and 608, liquid content may instantaneously convert into a gas 630 upon hot-platens 606 and 608 releasing composite mat 610, thus releasing the liquid content from composite mat 610 and quickly reducing the temperature of composite mat 610.

It should be understood that first stage 602, second stage 620, and third stage 626 may be or include one hot-pressing stage in which composite mat 610 is heated between hot-platens 606 and 608. After the hot pressing-stage, composite mat 610 may be cooled to a target temperature in a cold-pressing stage by cold-platens as described herein.

In some embodiments, the composite mat may have a thickness of greater than about 0.2 inches and less than about 1.5 inches and/or a density greater than about 45 pcf and less than about 70 pcf after the cold-pressing stage.

Figure 7:
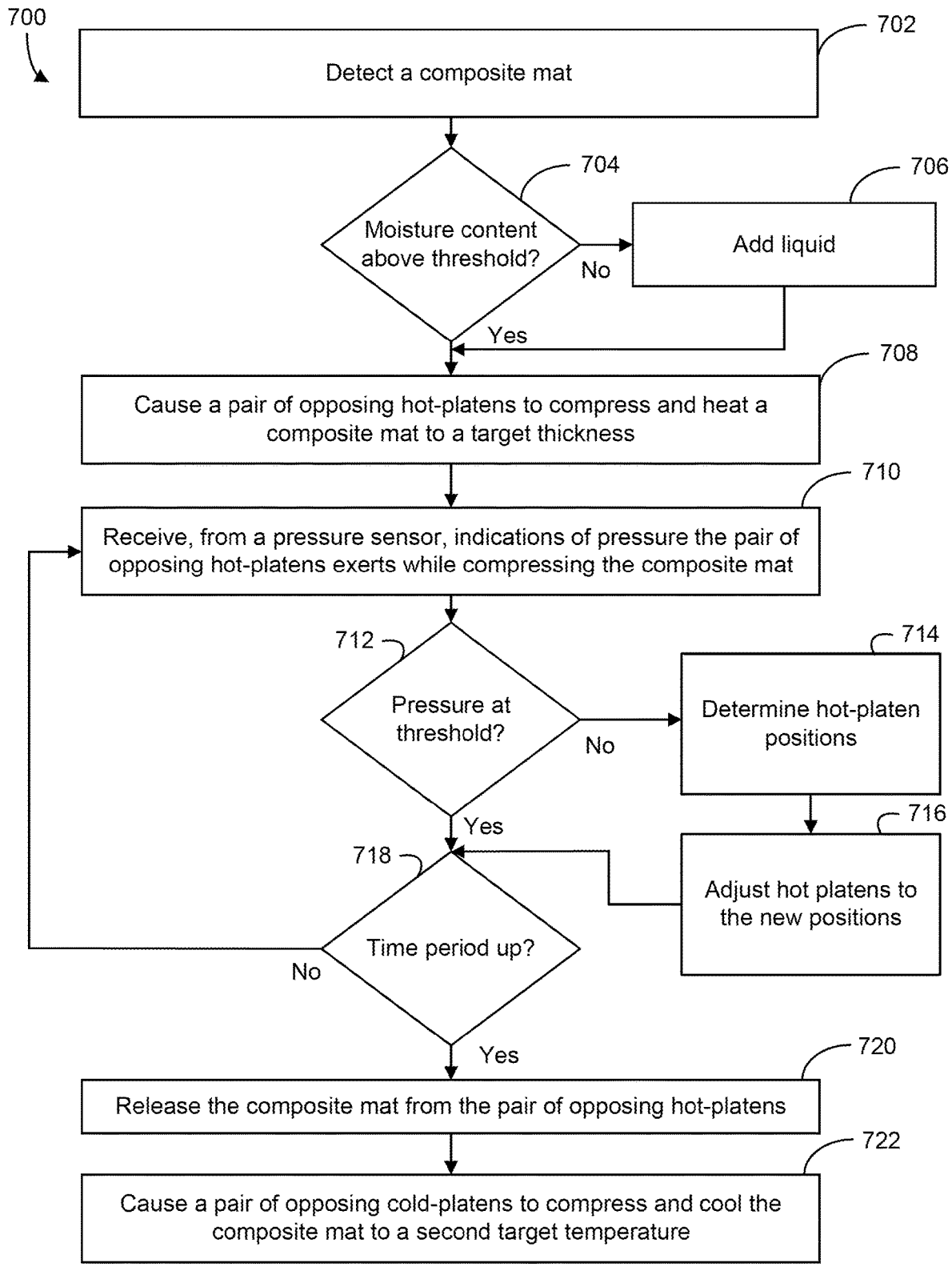
FIG. 7 is a flow diagram of an example process for forming a composite mat into a composite board using a sudden cooling technique, in accordance with some embodiments of the present disclosure.

FIG. 7 is a flow diagram of an example process 700 for forming a composite mat into a composite board using a sudden cooling technique, in accordance with some embodiments of the present disclosure. Process 700 can be performed using a manufacturing apparatus (e.g., manufacturing apparatus 502) and/or a data processing system (e.g., controller 504). Process 700 may include more or fewer operations and the operations may be performed in any order. Performance of process 700 may enable the manufacturing apparatus to manufacture, from waste materials, a composite board that can be used for roofing and/or siding. By performing the systems and methods, the data processing system may enable composite mat manufacturing apparatuses to cool composite mats more quickly than under previous methods. Thus, manufacturing apparatuses may manufacture composite boards faster and/or may be created to take up less space with shorter cooling platens.

At an operation 702, the data processing system may detect a composite mat. The composite mat may contain plastic and cellulose components such as paper and plastic fragments, as described herein, and/or liquid content (e.g., water, milk, alcohol, soft drinks, etc.). The data processing system may detect the composite mat based on a user input and/or based on sensor data that indicates the composite mat has been placed on the manufacturing apparatus (e.g., on a composite mat formation assembly stage, a conveyor belt assembly, or between a pair of opposing hot-platens). In some embodiments, the user input and/or the sensor data may further indicate a thickness, a mat composition, and/or a moisture content of the composite mat. The data processing system may receive the sensor data and/or user input and operate the manufacturing apparatus to create a composite board that can act as roofing or side paneling as described below.

At an operation 704, the data processing system may determine whether the composite mat has a liquid content that exceeds a threshold. Using the sensor data and/or a user input, the data processing system may determine an amount of liquid (e.g., moisture) that is in the composite mat and/or a percentage of the composite mat that is made up of liquid. The data processing system may retrieve a stored threshold from memory and compare the determined amount of liquid or percentage to the threshold to determine if the amount of liquid exceeds the threshold. In some cases, the data processing system may determine if the amount of liquid is within a predetermined range.

At an operation 706, responsive to determining the amount of liquid does not exceed the threshold or is not within the predetermined range, the data processing may transmit a signal that causes a liquid reservoir to release liquid onto the composite mat. The liquid reservoir may contain liquid such as water or any other liquid. The data processing system may transmit a signal to a device (e.g., an actuator or controller) that controls a position of the liquid reservoir to cause the liquid reservoir to pump, dispense, spray, or otherwise release liquid onto the composite mat to cause the composite mat to contain enough liquid to be above the threshold or be within the range. In some embodiments, the data processing system may determine a difference or a distance between the amount of liquid in the mat and the threshold or the range (e.g., by comparing the amount of liquid to the threshold). In such embodiments, the data processing system may control the positioning of the liquid reservoir to release enough liquid onto the composite mat to reach the threshold or range and then stop the composite mat from releasing the liquid. Thus, the liquid reservoir may not need to be refilled at each instance that the reservoir releases liquid onto a composite mat and can instead be used to add liquid to composite mats during multiple instances. By implementing such methods, the data processing system can ensure composite mats contain enough liquid to be cooled during a state transfer from a superheated state to a gaseous state.

At an operation 708, the data processing system may cause a pair of opposing hot-platens of the manufacturing apparatus to compress and heat a composite mat for a predetermined time period to a target thickness. The target thickness may be a target thickness for a first stage of compressing and heating the composite mat. For example, the data processing system may cause the pair of opposing hot-platens to heat and melt the components of the composite mat to minimize the mat's thickness. The data processing system may do so using a "position-controlled" method in which the data processing system retrieves a pattern of position data from memory and controls the positions of the pair of hot-platens using the pattern of position data for a predetermined time period. The pattern of position data may include the predetermined time period and positions of the hot-platens within the time period. In some embodiments, the data processing system may retrieve position data based on a current thickness and/or a target thickness of the mat. For example, the data processing system may receive sensor data and/or a user input that indicates the current thickness and/or a target thickness of the composite mat. The data processing system may use one or more of the thicknesses in a look-up table stored in memory to identify the position data to use to control the positions of the hot-platens to form the composite mat into the target thickness. By using predetermined patterns to form a composite mat shape, the data processing may ensure the hot-platens may create the composite mats without applying too much pressure and deforming the composite mats (or breaking the manufacturing apparatus) or too little pressure and allowing any superheated liquid within the mat to escape as gas.

At an operation 710, the data processing system may receive, from a pressure sensor (e.g., a pressure transducer), indications of pressure the pair of opposing hot-platens exerts while compressing the composite mat. The data processing system may receive such pressure data during another time period in which the data processing system is controlling the positions of the hot-platen based on the pressure that the hot-platens are exerting on the composite mat. The data processing system may receive the pressure indications from the pressure sensors as the hot-platens are heating and compressing the composite mat and use the pressure indications to control the positions of the hot-platens. For example, at the end of the time period in which the data processing system controls the hot-platens using the position-controlled method, the data processing system may use a pressure-controlled method to control the positions of the hot-platens. To do so, at an operation 712, the data processing system may retrieve a target pressure from memory. The data processing system may determine whether the pressure indications exceed or are within a predetermined range of the target pressure by comparing the pressure indications to the target.

Responsive to determining the pressure indications do not exceed or are not within a predetermined range of the target pressure, at an operation 714, the data processing system may determine new hot-platen positions for the hot-platens. The data processing system may determine a magnitude and/or a direction that the pressure is from the target pressure and determine a new position for the hot-platens to increase or decrease the amount of pressure to reach the target pressure according to the magnitude and/or direction. At an operation 716, the data processing system may adjust the positions of the hot-platens using the determined positions by transmitting signals that cause the hot-platens to either further close in on the composite mat to increase the applied pressure or release the hot-platens to apply less pressure. Because the target pressure may be a pressure that allows the liquid within the composite mat to superheat without changing state into a gas, by adjusting the positions of the hot-platens to apply such pressure, the data processing system may enable the composite mat to be heated at a constant pressure without turning the liquid contents of the mat into gas.

At an operation 718, the data processing system may determine whether a pressing time period has expired. The pressing time period may be the time period in which the hot-platens press the composite mat under both the position-controlled first stage and the pressure-controlled second stage or only the pressure-controlled second stage. The pressing time period may be a predetermined time period that enables the hot-platens to heat the composite mat to a target temperature. The pressing time period may be controlled by a speed of the conveyor belt in embodiments in which the manufacturing apparatus includes the conveyor belt assembly (e.g., the data processing system may control the speed of the conveyor belt so the composite mats remain between the hot-platen models for a predetermined time period) or a time in which the hot-platens apply pressure in embodiments in which the manufacturing apparatus is a static press without a conveyor belt. The data processing system may compare an amount of time that the composite mat has been compressed to the pressing time period to determine whether the composite mat's core has been heated to the target temperature. Responsive to determining that the time period has not yet expired, the data processing system may repeatedly perform operations 710-718 to ensure the hot-platens apply enough pressure on the composite mats so the liquid content can be superheated without turning into a gas while the other components melt until the core or the average temperature of the composite mat reaches the target temperature.

However, responsive to determining that the time period has expired, at an operation 720, the data processing system may transmit a signal that causes the hot-platens to release the composite mat. The signal may be a signal that causes the conveyor belt to move the composite mat away from the hot-platens or a signal that causes the hot-platens to change positions away from the composite mat to create a gap between the composite mat and the platens or to otherwise minimize the amount of pressure the platens are applying.

Advantageously, by using a predetermined time period instead of temperature data to determine when to release the composite mat, the data processing system may accurately determine when the composite mat has been properly heated. It can be difficult to determine the temperature of composite mats using sensors because the outer surface of the mat may quickly be heated to the temperature of the hot-platens while the heat is transferred throughout the mat. Thus, sensors that take the temperature of the outer surface may not accurately indicate when the core layer of the mat has been sufficiently heated. Because it can be difficult to insert sensors into the composite mat to obtain a reading of the core temperature, the data processing system may use the predetermined time period to more accurately determine when to stop heating the mat.

Upon releasing the composite mat from the pair of opposing hot-platens, the liquid in the composite mat may change state from its liquid state to a gaseous state. The decrease in pressure on the mat may allow for the stored liquid to convert into a gas and be released from the mat. For instance, for a liquid to boil (e.g., to change state from a liquid to a vapor) the vapor pressure of the liquid must exceed the ambient pressure. Because the data processing system controls the hot-platens to substantially increase the ambient pressure in the mat during pressing, the liquid may superheat and not turn into gas upon reaching its boiling point at normal pressure levels (e.g., one atmosphere). By releasing the composite mat, the data processing system may cause the pressure placed on the composite mat to be closer to the normal pressure levels, reducing the boiling point of the liquid within the mat without decreasing its temperature, causing the liquid to almost instantaneously convert into a gas upon relieving the pressure and for the core temperature to decrease.

At an operation 722, the data processing system may cause a pair of opposing cold-platens of the manufacturing apparatus to compress and cool the composite mat to a second target temperature. The second target temperature may be a temperature (e.g., 138° F.) in which the mat's contents freeze or congeal after melting under the hot-platens pressure and temperature. The data processing system may transmit a signal to a device (e.g., an actuator or a controller) that operates the cold-platens to compress and cool the composite mat to the second target temperature before the cold-platens release the composite mat. In some embodiments, the data processing system may transmit a signal to the conveyor belt to cause the conveyor belt to move the composite mat through the cold-platens. In such embodiments, the data processing system may control the speed of the conveyor belt so the cold-platens may remain at a cool temperature and at a constant position while the composite mat moves through the platens. The data processing system may control the speed so, by the time the composite mat exits the cold-platens, the composite mat has cooled to the second target temperature.

Systems that implement the process described herein may differ from systems that do not use such processes methods described herein because such systems often require the pressure to be released (e.g., periodically released or at pseud-random intervals) to move the mat using a conveyor belt. Consequently, in such implementations, the liquid often turns to steam and is released during hot-pressing, which may stop the sudden cooling effect from occurring at the end of the hot pressing event as described herein.

In some embodiments of the present disclosure, a method for producing a composite board comprised of polyethylene and cellulose is described. The method may include forming a mat comprised of polyethylene and cellulose components wherein the mat has a moisture content of about 3% or greater; subjecting the mat to opposing hot-platens having a hot-platen temperature of about 350-450° F.; and simultaneously compressing the mat at a pressure not less than about 25 psi for a first time period sufficient for a center of the mat to reach a temperature of about 260-340° F.; relieving applied pressure on the mat; subjecting the mat to opposing cold-platens having a cold-platen temperature of less than about 120° F. and simultaneously compressing the mat at a pressure of about 5-40 psi for a second time period sufficient for the center of the mat to reach a temperature that is less than about 220° F.

In some embodiments, the polyethylene and cellulose components are fragments. In some embodiments, the polyethylene component is present at a level of about 20-50%. In some embodiments, the panel has a density of about 45-65 pounds per cubic foot. In some embodiments, the panel has a thickness of about 0.150-1.000 inches.

In some embodiments, the temperature of the mat decreases by greater than 10° F. in a period of less than 5 seconds when pressure is relieved on the mat. In some embodiments, the temperature of the mat decreases by greater than 30° F. in a period of less than 5 seconds when pressure is relieved on the mat. In some embodiments, the temperature of the mat decreases by greater than 50° F. in a period of less than 5 seconds when pressure is relieved on the mat. In some embodiments, the mat is comprised of polyethylene, cellulose, and other components, including sheet goods and/or particles.

In some embodiments, a mat is formed based on a mixture of cellulose and plastic fragments and a water content of about 3% or greater. The mat may be heated and compressed in a press for a period of about 2-15 minutes such that the core of the mat reaches a temperature of about 260-340 F and the pressure exerted on the mat during the hot-pressing event is never less than about 25 psi in order to retain 0.5% or greater water content in the mat in a superheated state. Immediately after hot-pressing, pressure on the mat may be relieved such that the superheated water within the mat is abruptly converted to steam, which results in a sudden cooling effect.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system for producing a composite board comprised of plastic and cellulose, the system comprising:
   a mat formation assembly stage configured to form a composite mat comprising plastic, cellulose components, and water, the composite mat having a core at a midpoint between a proximate end and a distal end of the composite mat;

one or more pairs of opposing hot-platens that are used in a hot-pressing stage;
one or more pairs of opposing cold-platens that are used in a cold-pressing stage that occurs after the hot-pressing stage; and
a processor coupled to a memory having programmed instructions, wherein upon executing the programmed instructions, the processor:
transmits a first signal to the one or more pairs of opposing hot-platens, receipt of the first signal causing the one or more pairs of opposing hot-platens to compress and heat the composite mat;
receives, from a pressure sensor coupled to the one or more pairs of opposing hot-platens, indications of pressure the one or more pairs of opposing hot-platens exerts while compressing the composite mat;
based on the indications, transmits a second signal to the one or more pairs of opposing hot-platens, receipt of the second signal causing the one or more pairs of opposing hot-platens to heat and compress the composite mat at substantially a first pressure to superheat the water such that a temperature of the water remains above a boiling temperature of the water at a standard atmospheric pressure without the water changing from a liquid state to a gaseous state for a first time period sufficient for the core of the composite mat to reach a first target temperature;
transmits a third signal to the one or more pairs of opposing hot-platens, receipt of the third signal causing the one or more pairs of opposing hot-platens to release the composite mat from the first pressure after the first time period, wherein releasing the composite mat causes the superheated water in the mat to change from a liquid state to a gaseous state; and
transmits a fourth signal to the one or more pairs of opposing cold-platens, receipt of the fourth signal causing the one or more pairs of opposing cold-platens to compress and cool the composite mat for a second time period sufficient for the core of the composite mat to reach a second target temperature.

2. The system of claim 1, wherein receipt of the first signal further causes the one or more pairs of opposing hot-platens to heat and compress the composite mat at pressures above the first pressure for a second time period before the first time period.

3. The system of claim 1, wherein receipt of the first signal further causes the one or more pairs of opposing hot-platens to compress the composite mat to a predetermined thickness above a target thickness of the first time period within a second time period before the first time period.

4. The system of claim 1, wherein execution of the instructions further causes the processor to transmit the second signal to the one or more pairs of opposing hot-platens by:
receiving, from the pressure sensor, indications of a current pressure that the hot-platens are exerting on the composite mat;
determining that the indications of the current pressure are below a pressure threshold from the first pressure; and
responsive to the determination, transmitting the second signal to adjust a position of the hot-platens to exert a pressure at substantially the first pressure.

5. The system of claim 1, wherein releasing the composite mat from the first pressure causes a temperature of the core of the composite mat to decrease by a temperature that is directly proportional to an amount of superheated water in the composite mat at an end of the hot-pressing stage.

6. The system of claim 1, wherein releasing the composite mat from the first pressure causes a temperature of the composite mat to decrease by greater than 30° F. in a period of less than 5 seconds.

7. The system of claim 1, the system further comprising a water reservoir, and
wherein execution of the instructions further causes the processor to cause a first amount of water to be dispensed from the water reservoir into the composite mat to increase a total amount of water that is in the composite mat or within the plastic or cellulose.

8. The system of claim 7, further comprising a moisture sensor, wherein execution of the instructions further causes the processor to:
receive water content data from the moisture sensor, the water content data comprising an amount of water within the plastic and cellulose of the composite mat;
compare the amount of water to a water content threshold; and
wherein the processor causes the first amount of water to be dispensed from the water reservoir to the composite mat or the plastic or cellulose responsive to the determination that the amount of water is below the water content threshold.

9. The system of claim 1, wherein the plastic and cellulose components comprise paper and plastic fragments.

10. The system of claim 1, wherein the plastic comprises polyethylene.

11. The system of claim 1, wherein the plastic comprises polypropylene.

12. The system of claim 1, wherein the cellulose comprises paper.

13. The system of claim 1, wherein an amount of water within the composite mat before the hot-pressing stage is greater than about 3%.

14. The system of claim 1, wherein the composite mat has a thickness of greater than about 0.2 inches and less than about 1.5 inches after the cold-pressing stage.

15. The system of claim 1, wherein the composite mat has a density of greater than about 45 pcf and less than about 70 pcf after the cold-pressing stage.

16. The system of claim 1, wherein the pressure exerted on the composite mat during the hot-pressing stage is always greater than about 25 psi.

17. The system of claim 1, wherein a level of superheated water in the composite mat at an end of the hot-pressing stage is greater than about 0.5% and less than about 5.0% based on a total weight of the composite mat.

18. The system of claim 1, wherein during the hot-pressing stage, the composite mat is first compressed to a constant thickness that is greater than a target thickness of a final composite board for a second period of time that is before the first period of time and that ends when a core temperature of the composite mat exceeds a temperature of about 212° F.; and wherein the pressure exerted on the composite mat during the hot-pressing stage is always greater than about 25 psi.

* * * * *